United States Patent
Woltmann et al.

(10) Patent No.: US 8,360,007 B2
(45) Date of Patent: Jan. 29, 2013

(54) ANIMAL ENTERTAINMENT DEVICE

(75) Inventors: Klaus Woltmann, Teterboro, NJ (US);
Ryan Rutherford, Teterboro, NJ (US);
Jonathan Willinger, Teterboro, NJ
(US); Peter Ragonetti, Teterboro, NJ
(US)

(73) Assignee: J.W. Pet Company, Inc., Teterboro, NJ (US)

( * ) Notice: Subject to any disclaimer, the term of this patent is extended or adjusted under 35 U.S.C. 154(b) by 366 days.

(21) Appl. No.: 12/089,336

(22) PCT Filed: Dec. 1, 2006

(86) PCT No.: PCT/US2006/046080
§ 371 (c)(1),
(2), (4) Date: Apr. 4, 2008

(87) PCT Pub. No.: WO2007/064930
PCT Pub. Date: Jun. 7, 2007

(65) Prior Publication Data
US 2008/0230012 A1 Sep. 25, 2008

Related U.S. Application Data

(60) Provisional application No. 60/741,253, filed on Dec. 1, 2005, provisional application No. 60/850,779, filed on Oct. 11, 2006.

(51) Int. Cl.
*A01K 7/00* (2006.01)
*A63G 1/00* (2006.01)
(52) U.S. Cl. ............. 119/702; 104/78; 104/76; 119/703
(58) Field of Classification Search .......... 119/700–710; D30/160; 104/74–76, 78; 105/53, 63, 64, 105/68, 77, 78; 280/206, 207, 208
See application file for complete search history.

(56) References Cited

U.S. PATENT DOCUMENTS

| | | | | |
|---|---|---|---|---|
| 80,561 | A | | 8/1868 | Osborn |
| 320,960 | A | * | 6/1885 | Peirano .................. 119/708 |
| 620,415 | A | * | 2/1899 | Campbell ................ 104/76 |
| 815,211 | A | * | 3/1906 | Pattee et al. ............. 104/76 |
| 1,399,577 | A | * | 12/1921 | Riehl .................... 104/64 |
| 1,632,380 | A | | 6/1927 | Marcus |
| 2,499,470 | A | * | 3/1950 | Duncan .................. 104/76 |
| 3,195,505 | A | | 7/1965 | Hauth et al. |
| 3,537,726 | A | * | 11/1970 | Conover ................ 280/206 |
| 3,682,477 | A | * | 8/1972 | Harkins ................. 119/702 |
| 3,718,342 | A | * | 2/1973 | Freed ................. 280/87.01 |
| 3,742,908 | A | | 7/1973 | Merino |
| D231,371 | S | | 4/1974 | Willinger et al. |
| D232,036 | S | | 7/1974 | Willinger et al. |
| 3,865,082 | A | | 2/1975 | Lovitz et al. |
| 3,869,119 | A | * | 3/1975 | Oxley ..................... 472/45 |
| D235,111 | S | | 5/1975 | Lovitz et al. |
| 3,994,262 | A | | 11/1976 | Suchowski et al. |
| 4,027,626 | A | | 6/1977 | DeSousa |
| 4,064,839 | A | | 12/1977 | Rodemeyer et al. |
| D246,914 | S | * | 1/1978 | Dinnerstein et al. ......... D30/112 |
| 4,171,682 | A | | 10/1979 | Merino et al. |

(Continued)

OTHER PUBLICATIONS

International Search Report and the Written Opinion of the International Searching Authority dated Oct. 7, 2008, from the corresponding International Application.

(Continued)

*Primary Examiner* — Andrea Valenti
(74) *Attorney, Agent, or Firm* — Katten Muchin Rosenman LLP

(57) ABSTRACT

An animal entertainment device comprises a guide unit and a wheel that travels on the guide unit.

24 Claims, 17 Drawing Sheets

U.S. PATENT DOCUMENTS

| | | | |
|---|---|---|---|
| 4,386,787 A * | 6/1983 | Maplethorpe et al. | 280/206 |
| 4,505,346 A * | 3/1985 | Mueller | 180/7.4 |
| 4,735,173 A | 4/1988 | Dubreuil | |
| 4,890,827 A * | 1/1990 | Tottey | 472/86 |
| 5,078,094 A | 1/1992 | Hoover | |
| 5,092,269 A | 3/1992 | Phillips et al. | |
| 5,186,122 A | 2/1993 | Phillips et al. | |
| D335,554 S * | 5/1993 | Conner | D30/160 |
| D347,913 S | 6/1994 | Wellington et al. | |
| 5,572,955 A * | 11/1996 | Boshears | 119/706 |
| 5,664,525 A | 9/1997 | Phillips et al. | |
| 5,799,611 A | 9/1998 | Park | |
| 5,881,676 A | 3/1999 | Brown et al. | |
| D409,802 S | 5/1999 | Baker et al. | |
| 5,960,744 A | 10/1999 | Rutman | |
| 5,964,189 A | 10/1999 | Northrop et al. | |
| 6,044,799 A | 4/2000 | Tominaga | |
| 6,062,171 A | 5/2000 | Tominaga | |
| 6,067,939 A | 5/2000 | Tominaga | |
| 6,074,305 A * | 6/2000 | Schnapp | 472/15 |
| D430,708 S | 9/2000 | Lau | |
| 6,123,047 A | 9/2000 | Sakai | |
| D443,956 S | 6/2001 | Rudnick | |
| 6,405,682 B1 * | 6/2002 | Simon | 119/707 |
| D484,284 S * | 12/2003 | Venson et al. | D30/160 |
| 7,093,564 B1 | 8/2006 | Plante et al. | |
| 7,584,720 B1 | 9/2009 | Jackson | |
| D611,201 S | 3/2010 | Jakubowski et al. | |
| D611,202 S | 3/2010 | Jakubowski et al. | |
| D636,538 S | 4/2011 | Ragonetti et al. | |
| 2005/0115516 A1 | 6/2005 | Marchioro | |
| 2008/0230012 A1 | 9/2008 | Woltmann et al. | |
| 2010/0206241 A1 | 8/2010 | Ragonetti et al. | |

OTHER PUBLICATIONS

Talvet P. "Human Powered Elevator" Popular Science/Core 77, Oct. 20. 2003, retrieve from http://www.core77.com/challenge/humanpower/pages/1925_2.htm.

United States Office Action dated Aug. 27, 2010, from corresponding U.S. Appl. No. 29/363,347.

United States Office Action dated Sep. 28, 2010, from corresponding U.S. Appl. No. 29/363,347.

United States Office Action dated Jun. 21, 2012, from corresponding U.S. Appl. No. 13/043,928.

* cited by examiner

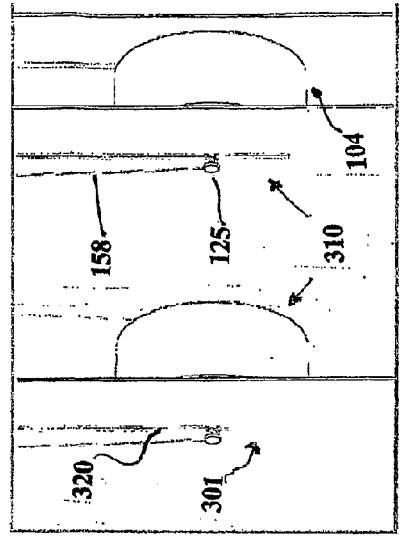
FIG. 4C
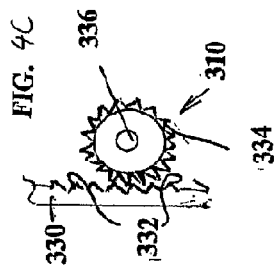
FIG. 4B
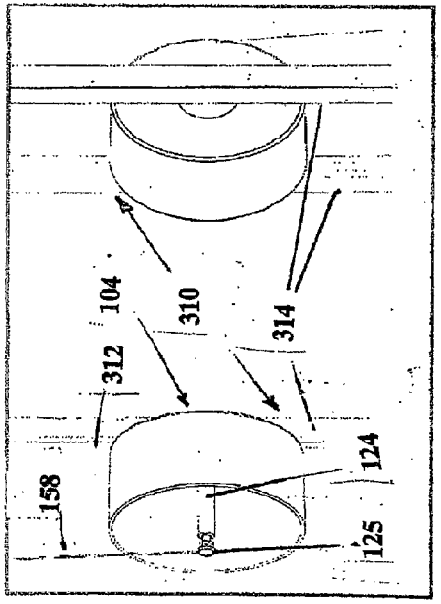
FIG. 4A
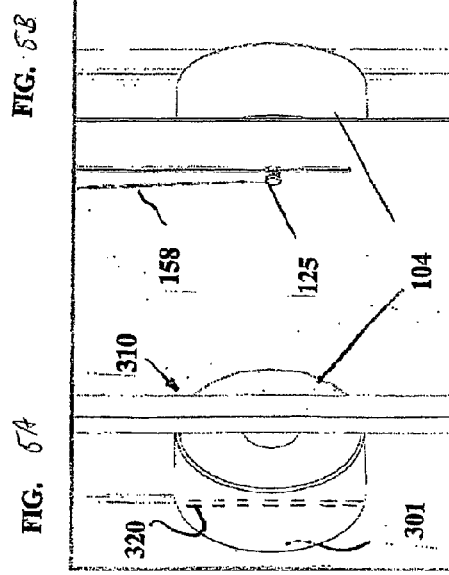
FIG. 6A  FIG. 6B
FIG. 5A  FIG. 5B

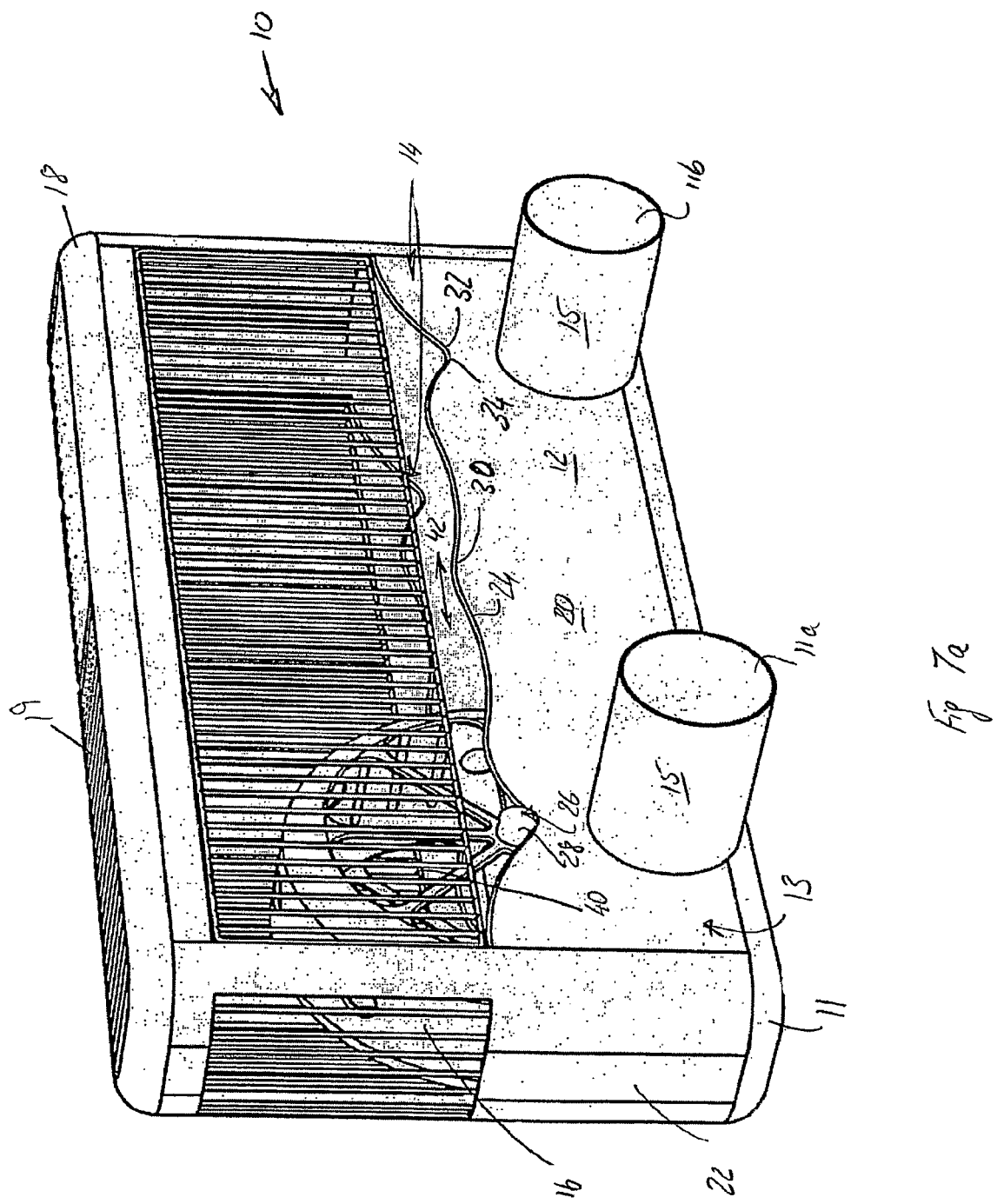

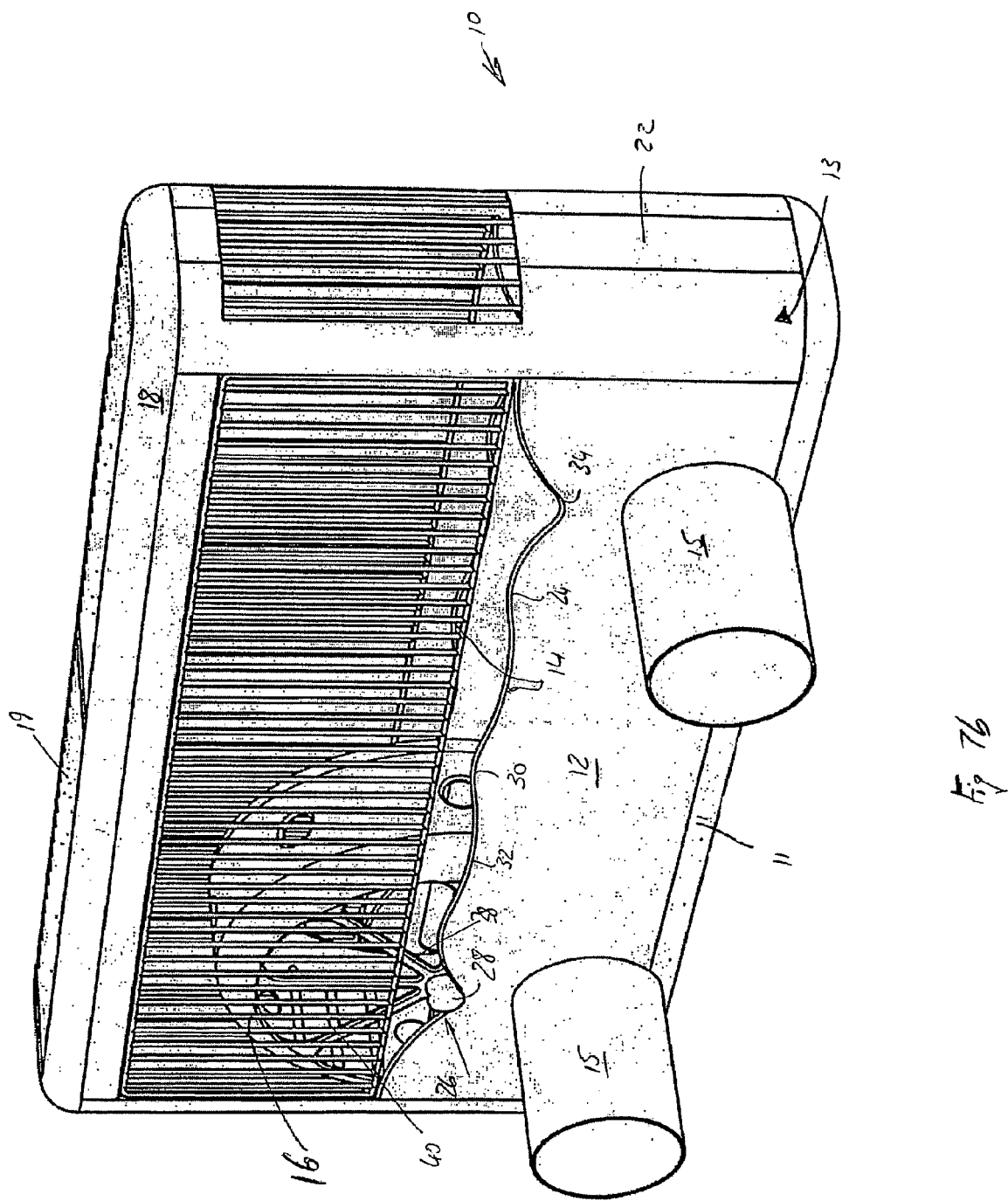

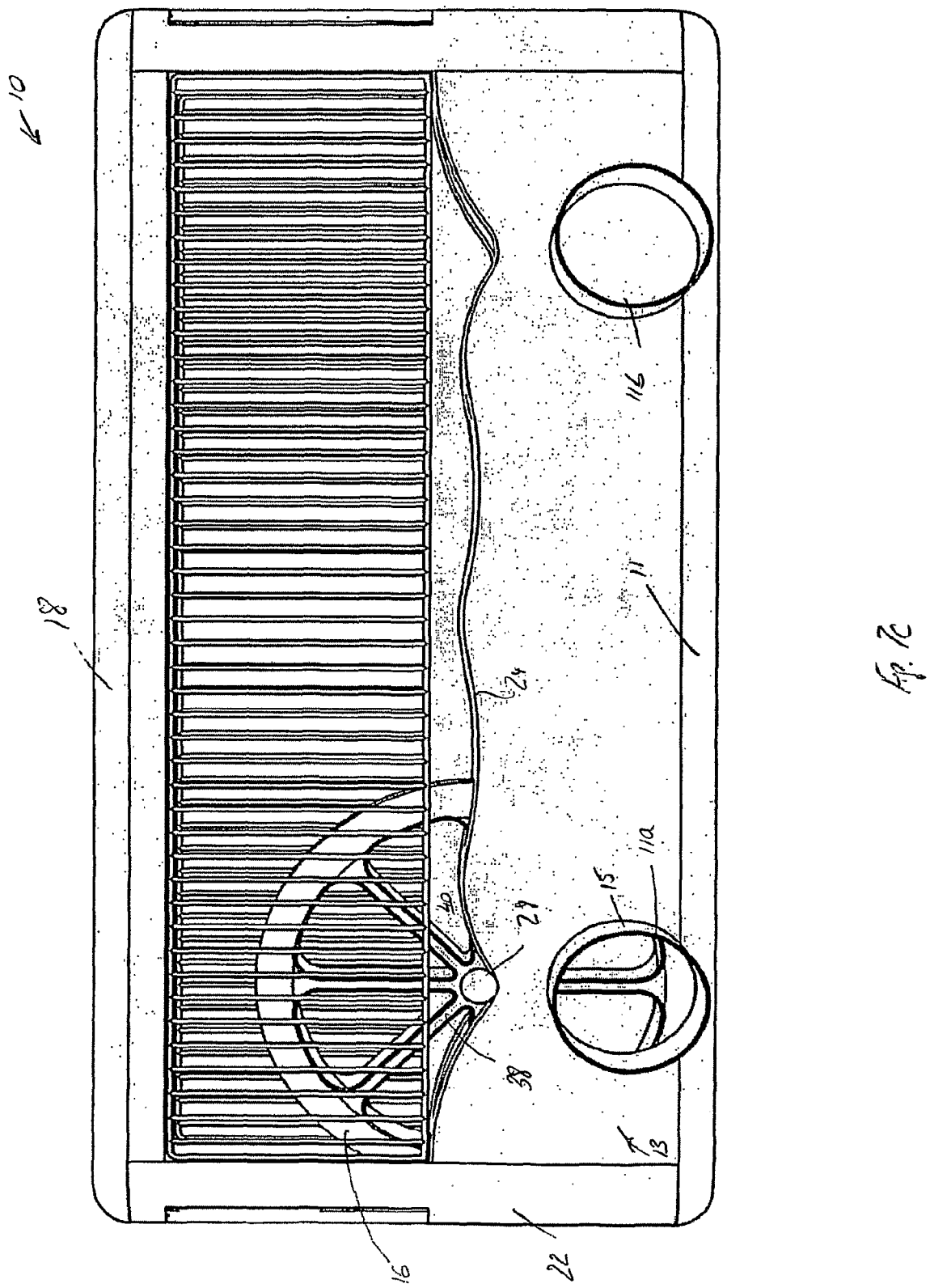

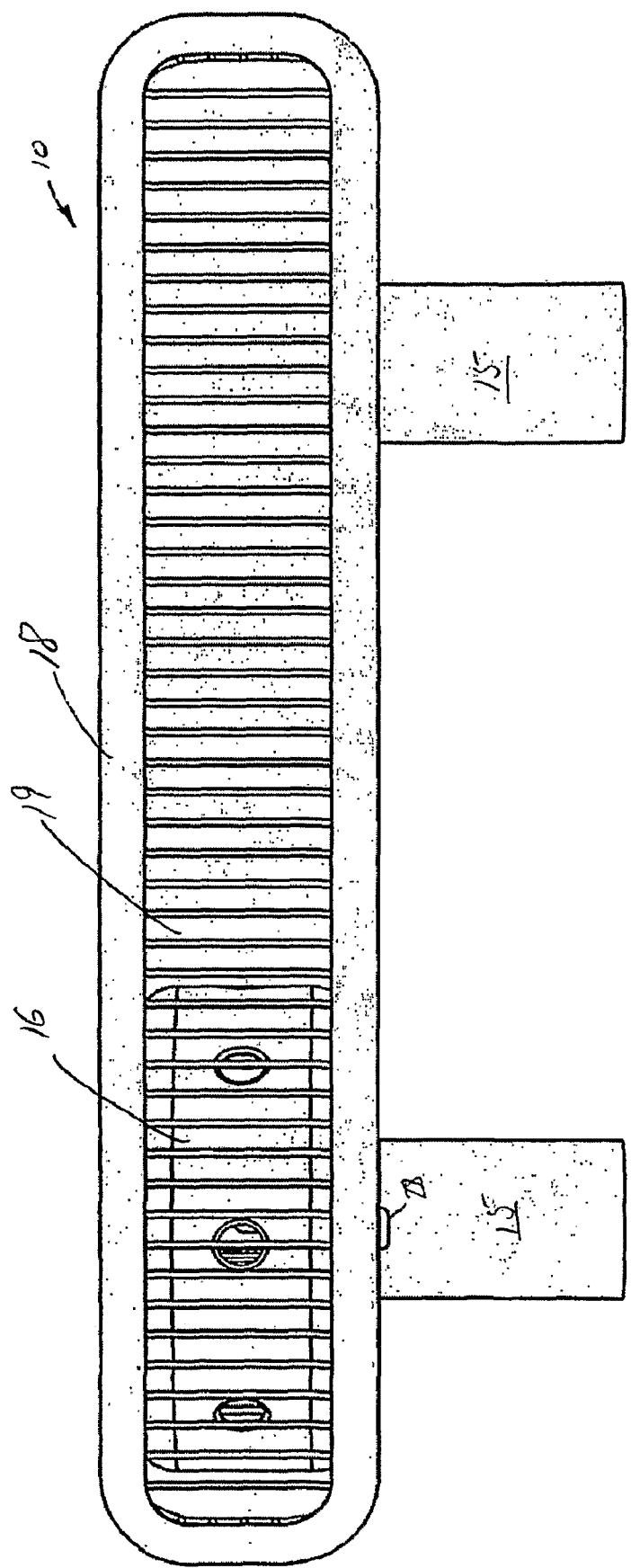

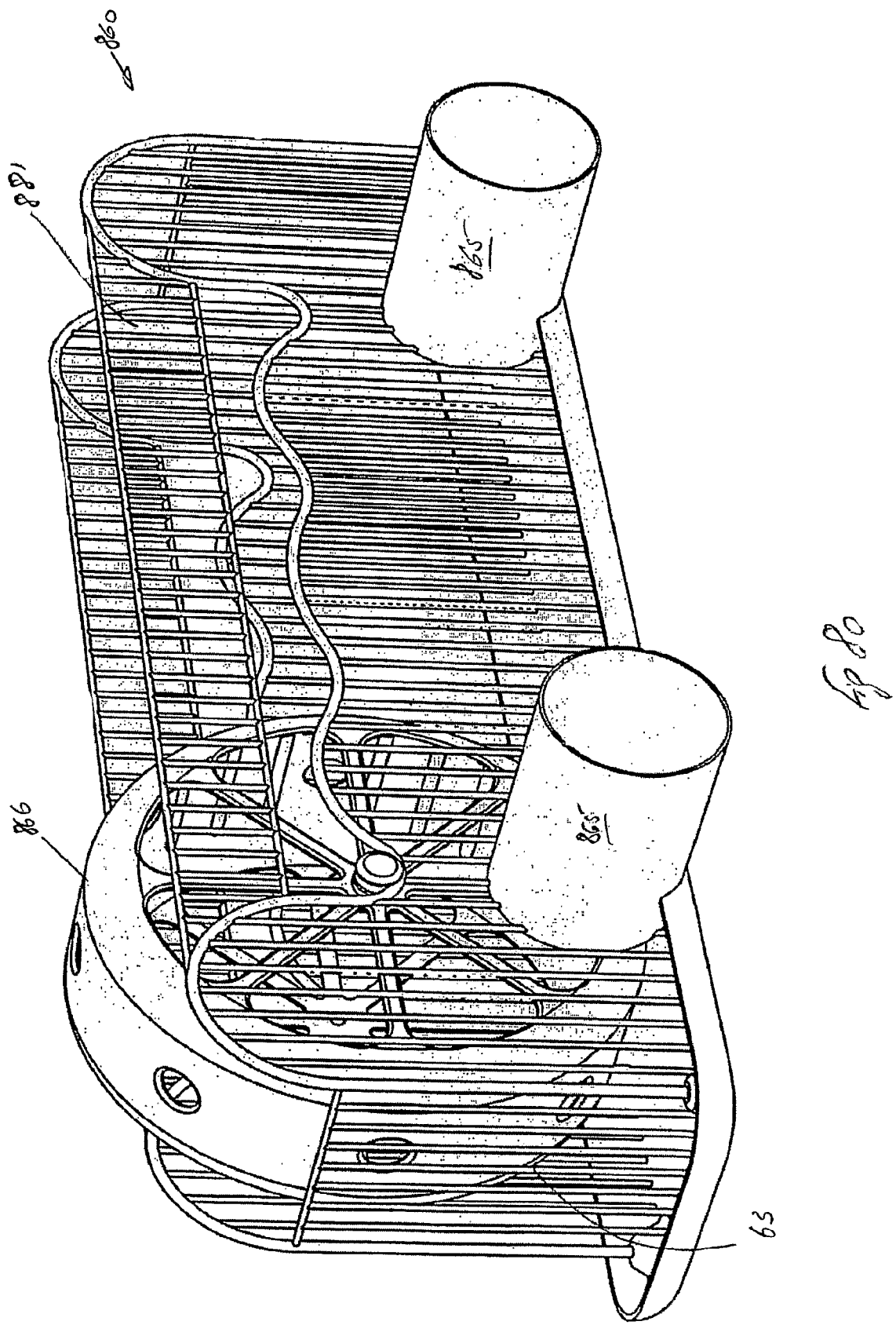

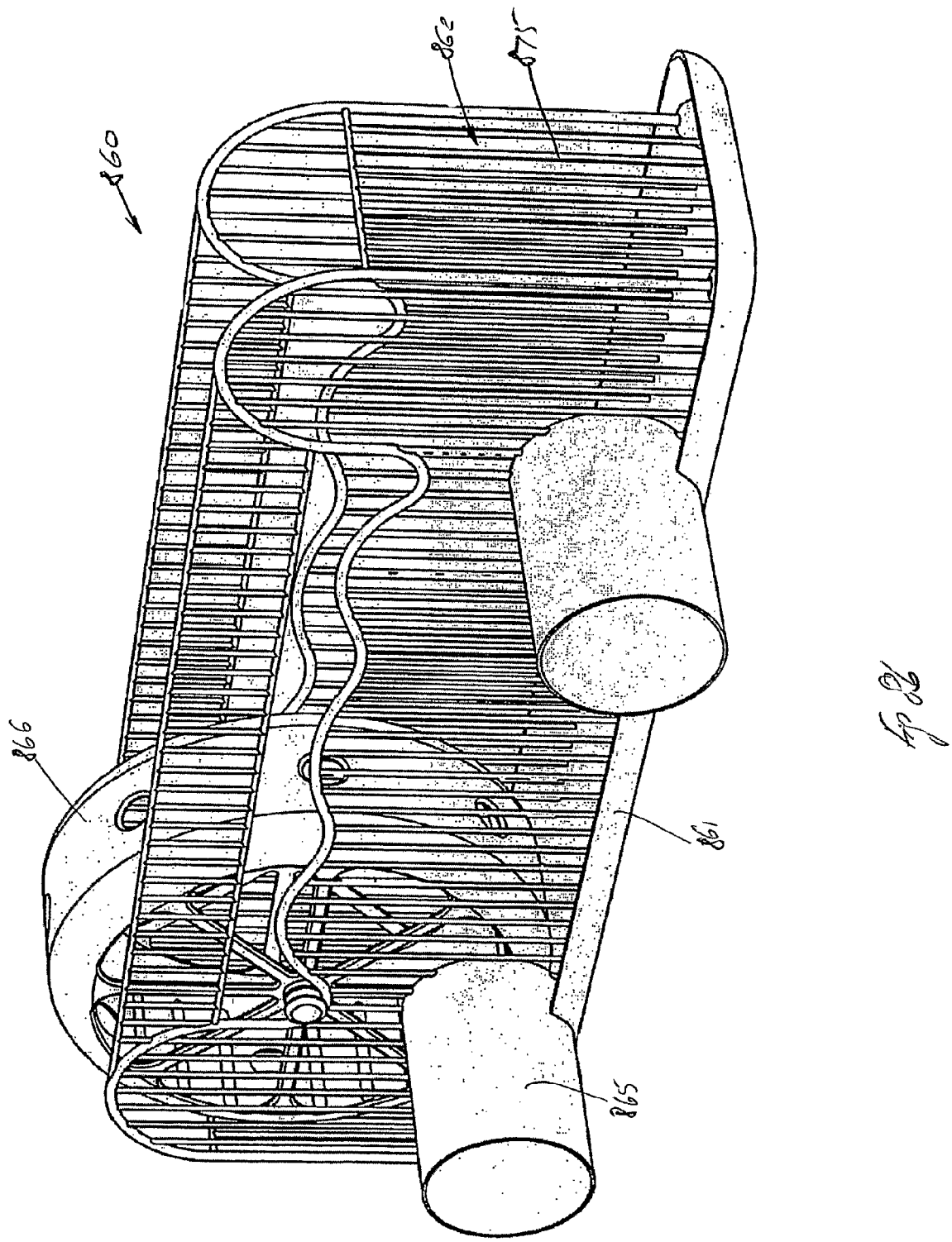

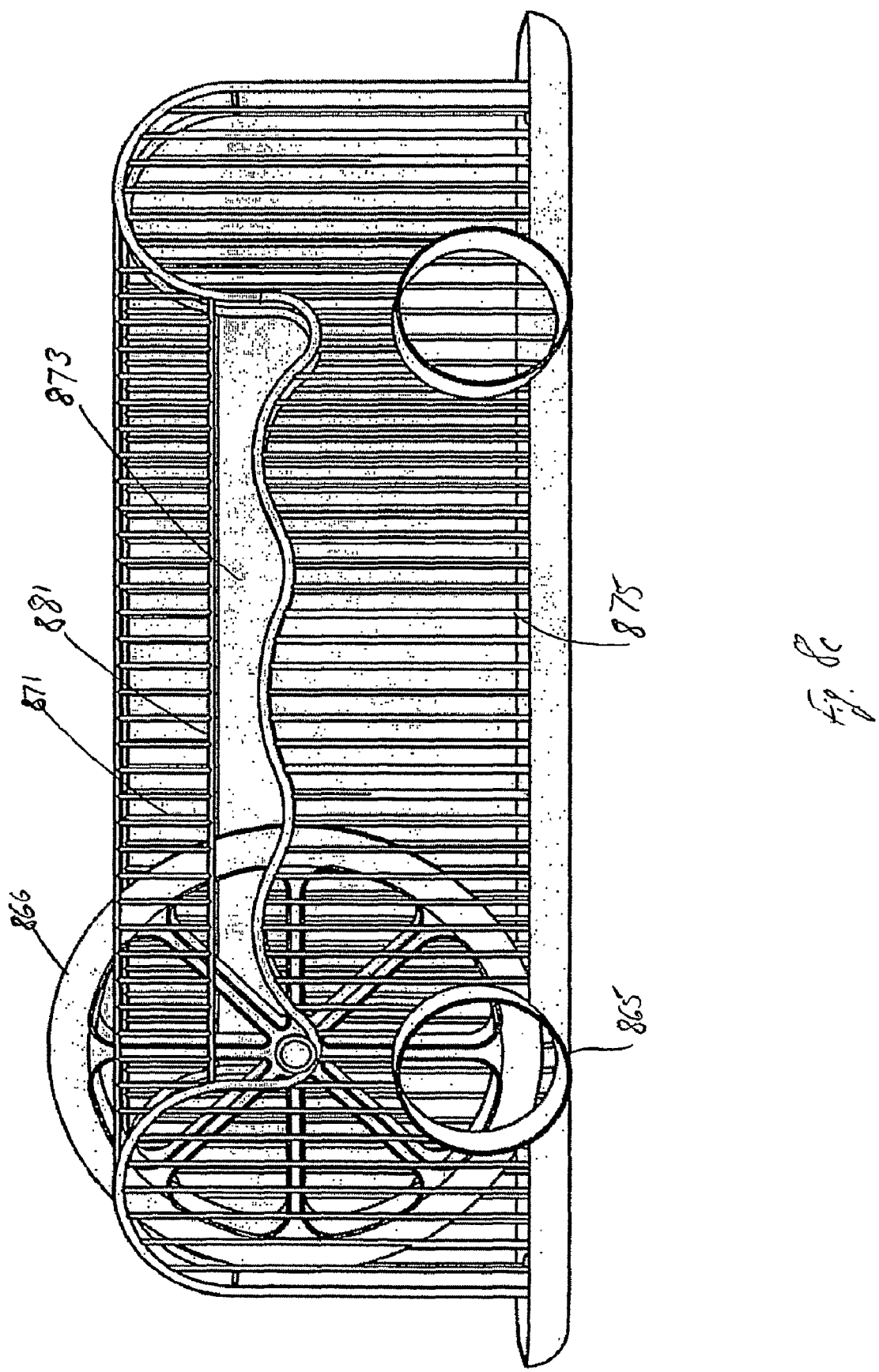

ANIMAL ENTERTAINMENT DEVICE

CROSS-REFERENCE TO RELATED APPLICATIONS

This application is a non-provisional counterpart to and claims priority to U.S. Ser. No. 60/741,253 filed on Dec. 1, 2005, which is pending and which is hereby incorporated for all purposes.

This application is a non-provisional counterpart to and claims priority to U.S. Ser. No. 60/850,779 filed on Oct. 11, 2006, which is pending and which is hereby incorporated for all purposes.

BACKGROUND OF THE INVENTION

1. Field of the Invention

The invention generally relates to toys for pets. In particular, the invention relates to an animal entertainment device that includes a wheel suitable for small animals that the animals can use for transporting himself from a first location to a second location.

2. Discussion of the Prior Art

Hamsters, mice, squirrels, gerbils and many other small animals that are kept as pets are typically housed in a cage, which by itself is not a stimulating environment. Thus, toys that provide stimulation and new experiences for small animals are highly desired. Preferably, such toys are designed so an animal can learn from its own instincts to utilize the toy. Therein, even more preferable is when a toy can be utilized by the animal in a basic function such as moving from one location to another. The present invention introduces an animal entertainment device in the form of a transport wheel, which allows a small animal to do exactly that, moving from a predetermined first location to a predetermined second location and vice versa and introduces a safe way for the animal to enter and exit on its own accord.

Wheels are for small animals are known; such wheels are commonly called exercise wheels. An exercise wheel allows a small animal to run full speed to its hearts' content and obtain exercise. However, depending on the type of wheel, the animal may be stuck at exactly the same place as where it started. Such stationary wheels are can be placed on a ground or suspended in a habitat cage. Most commercial exercise wheels marketed for small animals have rungs which are not suitable for them due to the fact that an animal can be injured. A stationary exercise wheel may not fully recreate a natural habitat of small animals because of its stationary nature becomes boring for the animal. Also, a viewer watching an animal running on a stationary wheel may become disinterested within a relatively short time.

Other kinds of exercise wheels—hamster balls or cars—are essentially closed balls configured to have an inner space, into which an animal is placed and then, by its own action, ends up in a random location of the house or yard. Since the interaction is random, the use of these toys requires supervision. Unsupervised pets can become trapped against furniture, trees or bushes and panic, or they can roll down stairs, injuring themselves.

A need, therefore, exists for an animal entertainment device of a transport wheel, to be integral with a cage or habitat, i.e. habitat cage, for a small animal that enables a wheel to move reciprocally within the habitat along a generally vertical path so that the animal moves from a predetermined first location to a predetermined second location. A need exists for the animal entertainment device to safely allow an animal to enter and exit the wheel.

A need exists also for a wheel to be integral with a housing for the wheel, so that the wheel and housing assembly may be readily movable and/or removable from the habitat cage to another location or habitat cage.

Another need exists for an animal entertainment device assembly, such as a animal entertainment device assembly of a transport wheel and housing assembly, for a small animal that enables a transport wheel to move reciprocally along a path having generally horizontal and vertical stretches from a predetermined first location to a predetermined second location.

Still another need exists for an animal entertainment device assembly of a transport wheel and housing assembly that is resistant to being gnawed on by an animal.

A need, therefore, exists for a animal entertainment device assembly of a transport wheel and housing assembly that is operative to travel along a longitudinal path while transporting an animal between designated ingress/egress points along the path.

Another need exists for a animal entertainment device assembly of a transport wheel and housing assembly that is configured as a wheel.

Still another need exists for a transport wheel for transporting an animal that may by integrated in a cage structure or configured as a stand-alone assembly.

A further need exists for a transport wheel for transporting an animal along a longitudinal track that can be reconfigured by an assembly operator.

SUMMARY OF THE INVENTION

These needs are satisfied by the invention. In accordance with one embodiment of the invention, a transport wheel allows an animal to move reciprocally from a predetermined first location to a predetermined second location. The transport wheel and housing are integral with each other so as to be free standing and separately usable from the habitat cage.

In addition, the wheel and housing assembly is integral with the habitat cage and includes an housing, a wheel for small animals, and a lifting mechanism for guiding the exercise wheel between the top and bottom of the housing while an animal runs on the wheel.

When an animal enters the wheel and starts running based on its won accord and/or acquired skill or instinct, the wheel will act as an elevator traveling along a linear path between the top and bottom of the housing. If the animal stops running before the wheel reaches the top or bottom, a friction force between the paws of the animal and the surface of the wheel prevents the wheel from dropping to the bottom of the housing. When the animal reaches the top most position, the wheel comes to safe stop in a stop formed in the housing and allows the animal to safely exit. Similarly, when the animal reaches the bottom most position, the wheel comes to a safe stop in a stop formed in the housing and allows the animal to safely exit.

These needs are also satisfied by a travel wheel assembly actuated by an animal and configured in accordance with the invention to travel along a guide surface while transporting the animal. The inventive assembly is configured with a travel wheel or transport wheel for the animal operative to move along a longitudinal or closed wavy travel path of a guide unit in response to an animal-generated force.

In accordance with one aspect of the invention, the inventive travel wheel assembly is a stand-alone unit provided with a cage or cage, which is configured to receive a guide unit, and a travel wheel guided upon the guide surface of the guide unit and actuated by an animal. The cage and guide unit are configured to allow the animal to enter and exit the transport wheel at designated ingress/egress point or points located along the travel path of the travel wheel. The cage having bottom and top trays and a peripheral wall therebetween is made from plastic or wire to provide an observer with a clear view of the animal and transport wheel. The guide unit guide has a topless structure including a pair of opposite sidewalls at least one of which is provided with one or more multiples ingress/egress openings that communicate with respective ingress/egress points of the cage for entering/exiting of the animal into and from the interior of the transport wheel. The sidewalls of the guide unit have respective uniformly configured top edges functioning as guide tracks that support the axle of the transport wheel and, thus, define a longitudinal travel path of the transport wheel travels. The track defined by each sidewall of the guide unit is preferably, but not necessarily, has a wavy contour. Therefore, the animal running in the transport wheel applies variable forces depending on the contour of the guide tracks. If the transport wheel reaches descending portions of the longitudinal travel path, the animal applies a minimal force to advance the wheel. On the other hand, ascending stretches of the longitudinal path require that the animal apply a substantial force to advance the wheel up along these stretches. The sidewalls of the guide unit are so configured that the animal actuating the transport wheel is confined within the wheel while it travels along the longitudinal path between designated ingress/egress points configured to allow the animal to exit or enter the interior of the transport wheel.

A further modification of the inventive animal entertainment device assembly of a transport wheel and housing assembly includes a cage or cage and a guide unit configured to guide a transport wheel along a longitudinal guide path. In contrast to the previous embodiment in which the guide unit has substantially continuous sidewalls made from plastic, the assembly in accordance with this modification is provided with sidewalls made from wires. The wires of the respective sidewalls are uniformly formed to define guide tracks receiving the axles of the transport wheel. The wires or tracks each preferably, but not necessarily, have a wave-shaped cross-section and configured to guide the transport wheel.

In accordance with a further aspect of the invention, the inventive animal entertainment device assembly of a transport wheel and housing assembly is configured as hybrid of the previously disclosed modifications. The inventive assembly has a cage, guide unit and transport wheel actuated by an animal to run along the longitudinal travel path of the guide unit. The guide unit includes only one sidewall made either from wire or plastic and defining one of tracks for the transport wheel. A recess in one of the sidewalls of the cage defines the other track.

In accordance with still another aspect of the invention, the sidewall of the guide unit has at least one formation configured to provide an animal with ingress/egress into/from the cage. Placed in a larger cage, the formation of the inventive animal entertainment device assembly of a transport wheel and housing assembly allows the caged animal to shuttle between the interior of the transport wheel and the surrounding interior of the larger cage.

According to a further aspect of the invention, instead of a generally linear travel path of a transport wheel, the inventive animal entertainment device assembly of a transport wheel and housing assembly is configured with a guide unit allowing a transport wheel to travel along a generally circular path. The track unit, thus, has two uniform closed guide tracks guiding the transport wheel along a closed travel path.

A further modification of the inventive animal entertainment device assembly of a transport wheel and housing assembly includes a variously configured cage enclosing a guide unit and a transport wheel. In one embodiment, the cage may have upper and lower trays bridged by a plurality of wires. In accordance with a further modification, the cage has a peripheral wall bridging upper and lower trays and made from transparent material, such as plastic. Still in a further modification, a cage may be provided with upper and lower trays and a peripheral wall which can have some regions made of wire and other regions made of plastic. Besides the entertaining effect the inventive assembly has on a viewer, it also allows the animal to exercise in an environment at least remotely resembling the natural habitat of the animal. Accordingly, the inventive assembly is beneficial to mental and physical health of the animal and the source of entertainment for the viewer A further aspect of the disclosure relates to a animal entertainment device assembly of a transport wheel and housing assembly configured with a cage, guide unit within the cage and transport wheel which is operative to travel along the track of the guide unit. In contrast to the previously disclosed structural modifications of the inventive assembly where the track has a predetermined unmodifiable configuration of the track, the track of this embodiment can be reconfigured to define different travel paths. In this respect, the inventive track according to the present invention operates similarly to railroad tracks provided with a plurality of Y switches that are operative to change the itinerary of a traveling body, such as the transport wheel of the present invention powered by the animal.

BRIEF DESCRIPTION OF THE DRAWINGS

The above and other features and advantages will become more readily apparent from a detailed description taken in conjunction with the following drawings, in which:

FIG. 4A is an elevated view of a guide system configured with a single track for guiding a take-up system, which is coupled with a transport wheel;

FIG. 4B is an elevated view of a guide system configured with two tracks.

FIG. 4C is a modification of a track system of the wheel assembly according to the present invention FIGS. 5A and 5B are right- and left-side views of a guide system, respectively, that has an enclosed track in a wall of an housing on one side of a transport wheel and a groove cut on the opposite side of the housing of an housing;

FIGS. 6A and 6B are right- and left-side views of a further guide system, respectively, provided with a groove cut in one of opposite sides of the housing;

FIGS. 7a-7d illustrate various configurations of inventive animal entertainment device assembly of a transport wheel and housing assembly.

FIGS. 8a-8d illustrate various configurations of inventive animal entertainment device assembly of a transport wheel and housing assembly.

DETAILED DESCRIPTION

Figure 1:
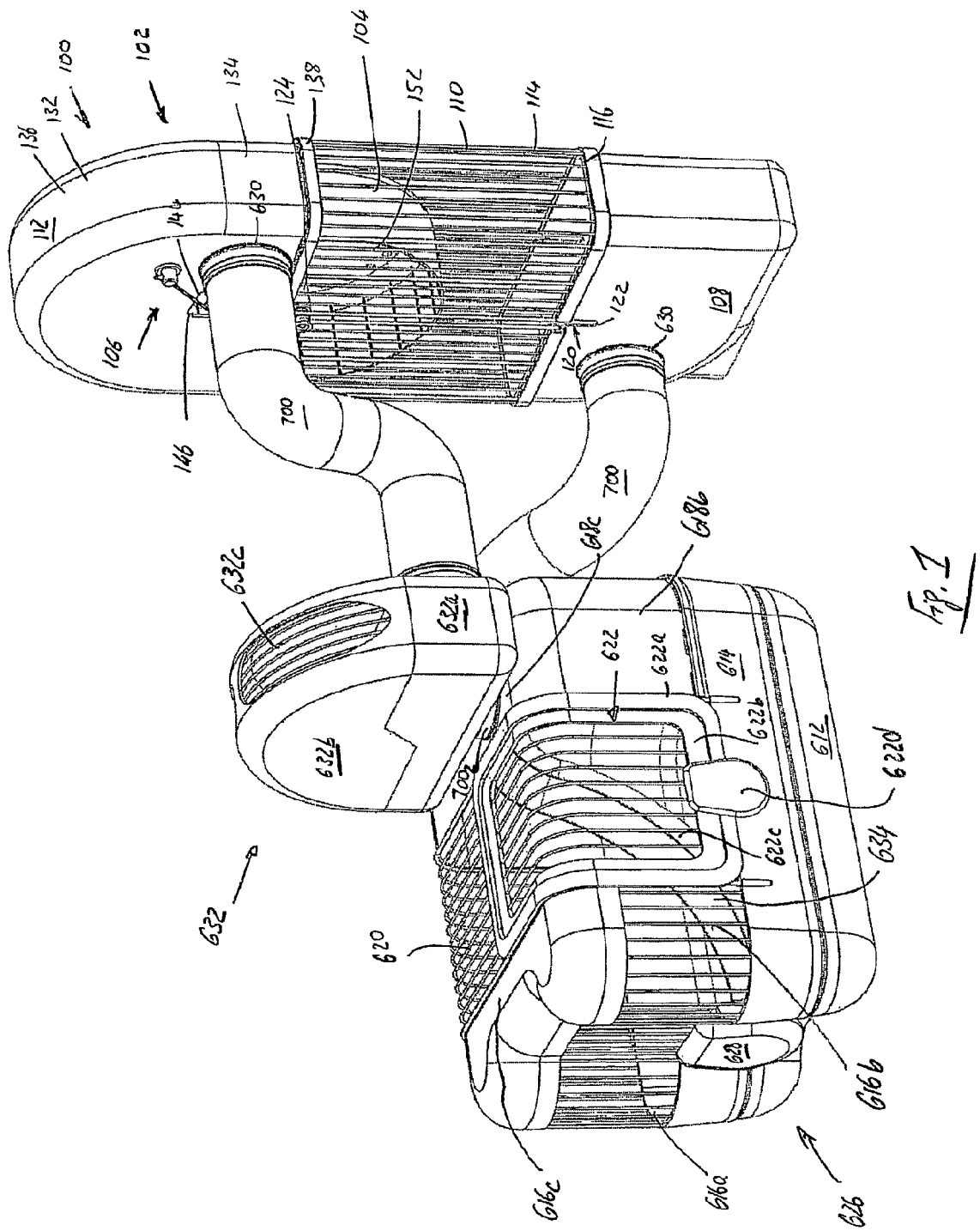
FIG. 1 is an perspective view of an animal environment that includes a habitat cage and a housing and transport wheel assembly according to a first embodiment of the present invention and illustrating a transport wheel between a top and bottom of the housing.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, left, right, up, down, over, above, below, beneath, rear, and front may be used with respect to the drawings. These and similar directional terms should not be construed to limit the scope of the invention in any manner. The words "attach," "connect," "couple," and similar terms with their inflectional morphemes do not necessarily denote direct and immediate connections, but also include connections through mediate elements or devices.

Figure 2:
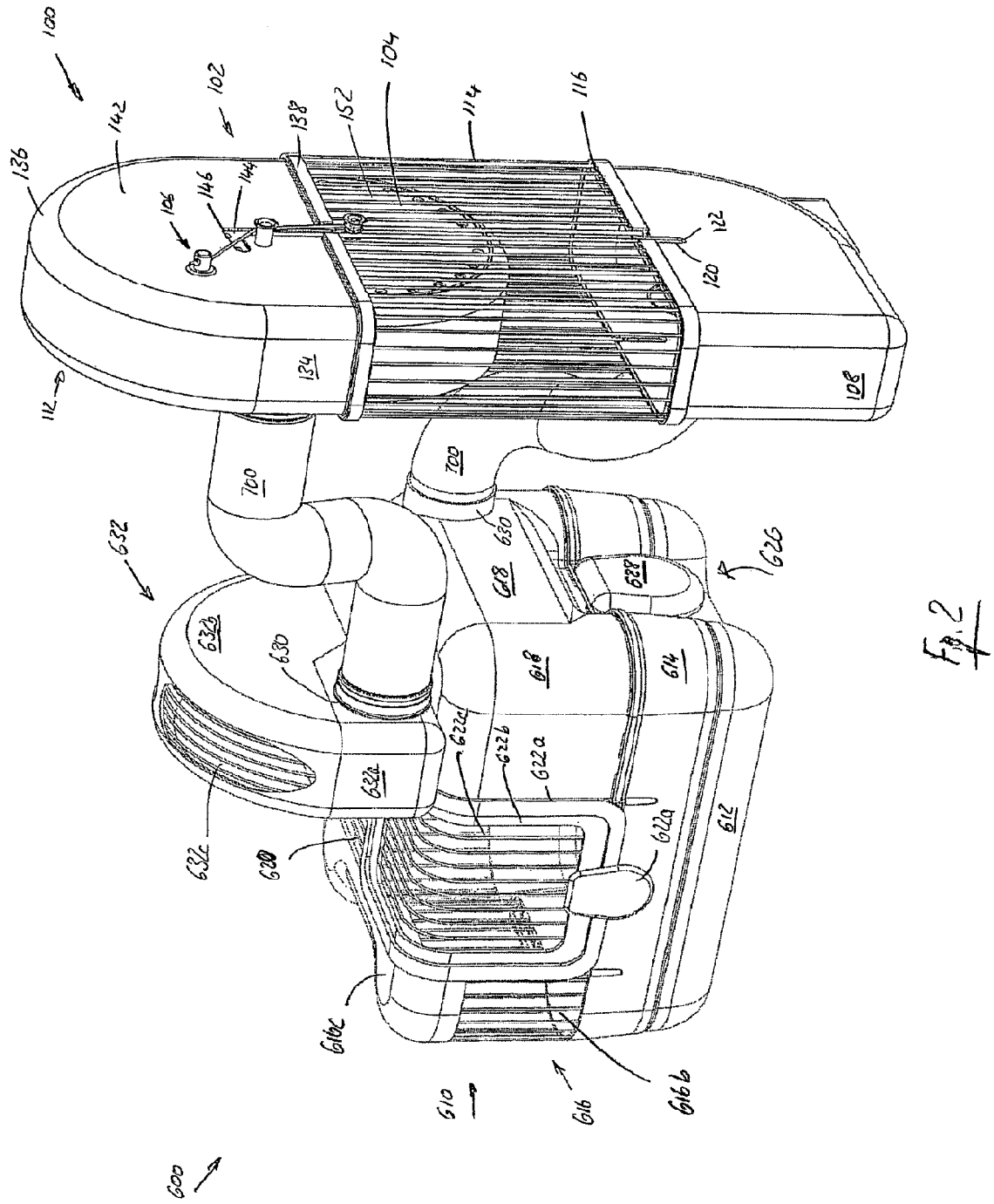
FIG. 2 is an perspective view of the housing and transport wheel assembly of FIG. 1 in a second perspective.

FIGS. 1-2 illustrate an animal environment 600 that includes a habitat cage 610 and a animal entertainment device assembly of a transport wheel and housing assembly 100 connected by conduits 700. The animal entertainment device assembly of a transport wheel and housing assembly 100 is configured in accordance with one of the embodiments of the present invention and having a housing 102, a transport wheel 104 and a guide system 106.

Housing 102 is configured as a cage having spaced apart members in a central portion and a top and bottom box, i.e. receiver, made of solid material. Yet, any part of the housing may also be configured as solid or similar design made of plastic, metal or the like. The wheel 104 is enabled to move along a generally vertical path by a small animal—a hamster, mouse, gerbil or squirrel—running on the wheel's inner surface.

Depending on a direction in which the animal runs, wheel 104 can move upwards or downwards. When the animal reaches a stop 122, downward direction, or a stop 146, upward direction, it is unable to move the wheel further. When the animal reaches the top most position, the wheel comes to safe stop in respective stop 146 formed in housing 102 and allows the animal to safely exit. Similarly, when the animal reaches the bottom most position, the wheel comes to a safe stop in respective stop 122 formed in the housing and allows the animal to safely exit.

The wheel and housing assembly 100 may be a integral with a habitat cage or may be a separate unit from the habitat cage and be positioned in the habitat cage or exterior as shown in FIGS. 1-2. Advantageously, this allows the wheel and housing assembly to be used in multiple habitat cages for users who have a limited budget, but multiple animals in different habitat cages. The animal entertainment device assembly of a transport wheel and housing assembly 100 may also be used to connect two more habitat cages, when provided with suitable openings, to allow the animal to transport himself between the cages and enjoy both.

FIG. 1 shows wheel 104 suspended substantially midway between a top 112 and bottom box 108 of housing 102. The box 108 is dimensioned to allow wheel 104 to be lowered to the stopped position in which the bottom segment of wheel 104 is located close to the floor of box 108. A ledge 116 located adjacent to the upper edge of box 108 supports a housing wall 114.

The box 108 has at least one opening 118 sufficiently sized for an animal to enter or exit the box and proceed onto or from the inner surface of wheel 104, when the latter is in its stopped position, and to remove the animal from the housing. While box 108 as shown is rectangular, other cross-sections including, for example, round, oval and other regular or irregular shapes can be easily utilized, provided that an animal enter or exit wheel 104. The top edge of box 108 is provided with two brackets 120 formed on respective opposite sides of box 108. Each of brackets 120 defines a stop 122 in which wheel axle 124 is placed when wheel 104 is safely stopped.

Returning to FIG. 1, a pair of brackets 120 is formed in bottom box 108, but may also be formed to extend from box 108. The brackets are U-shaped and may be aligned with opening 118. Each bracket is configured to support an axle 124 of transport wheel 104 so that an animal may enter or exit the inner surface of wheel 104 through opening 118. Materials that may be used for box 108 include plastic, metal and/or wood.

The wall 114 of housing 102 has a plurality of metal wires 110 spaced from one another so that an animal cannot voluntarily leave transport wheel 104 between top 112 and bottom 108 of housing 102. Lower ends 126 of wires 110 are coupled to an endless flange 128 supported by ledge 116 of box 108. The top 112 of housing 102 receives opposite wire ends 130. The ends of wires 110 and the top and bottom of housing 102 may be fixed to one another or be removably connected to one another. Like box 108, housing wall 114 can be made from different materials including metal wire, plastic and wood and have a cross section similar to box 108.

The top 112 has an housing 132 including a hollow base 134 and an arcuate top 136 which bridges at least one pair of opposite sides of base 134. The top 112 is dimensioned to fully receive wheel 104 when the wheel arrives at its elevated position. Although top 136 is shown to have a similar width to the width of base 134, it may be configured with a greater or smaller width.

The base 134 and top 136 may define a pair of windows provided to facilitate observation of an animal and to reduce the overall weight of assembly 100. However, arcuate top 136 and base 134 may be formed as a box without windows as shown.

Sidewalls 142 of top 112 have respective generally L-shaped recesses 144 each provided in a vertical alignment with stop 122 of bottom box 108. The recesses 144 are dimensioned to slidably receive the respective opposite ends of axle 124 and guide wheel 104 to its elevated position. Stop 146 is configured as a bent portion of recess 144 and provides a reliable support for axle 124 in the elevated position of transport wheel 104 to prevent it from voluntarily leaving this position.

Each recess 144 may also be defined between a pair of arms that extend from a bottom flange 138 of top 112 towards box 108. The recess preferably include free ends that diverge downwards from one another for centering axle 124 in recess 144, to prevent the axle from deviating from a generally vertical path on its way to the elevated position.

The bottom flange 138 of top 112 extends outwards from base 142 and receives the upper ends of wires 110 of housing wall 114. The wires 110 may be fixed to flange 138 or detachably coupled to the flange.

The shape of top 112 is selected in accordance with the shape of wall 114 of housing 102. The base 134, like bottom box 108, has an opening 135 that is dimensioned to allow an animal to enter or exit from the running surface of wheel 104 in the elevated position thereof from or onto a platform.

The transport wheel 104 has one side closed or delimited with a perforated wall, for example, 152 on one of its opposite sides, while the other side may be completely open to allow the pet owner an unblocked access to the interior of wheel 104, when the wheel reaches the elevated or stopped positions. Alternatively, one of the opposite sides of the wheel may have an arrangement of spokes both opposite sides may be completely open. The wheel 104 may be made from any suitable material including, but not limited to, plastic or metal and have a continuous or discontinuous body 154.

The inner or running surface 156 of wheel 104 is continuous or has very small gaps so as to minimize a possibility of injury to the animal. Axle 124 includes a central portion 123 and axle ends 125 that include a pair of spaced rollers 117 dimensioned to prevent displacement of the axle end from stop 122 of bracket 120 in the stopped position of wheel 104. The rollers 117 are either detachably mounted to axle 124, if wheel 104 is removable from housing 102, or fixed to axle 124. It has been observed that the larger the diameter of central portion 123 of axle 124, the easier transport wheel 104 descends carrying a weight. Preferably, the axle ends 125 each have a diameter smaller than a central portion 123 of the axle.

A guide system 106 has a take-up mechanism, for example, of two separate, identically dimensioned ropes 158. Each of the ropes has one of its opposite ends attached to axle end 125 between rollers 117 and the opposite end to a stationary support 162. The rope 158 is guided by a system of strategically located guide elements and, as will be explained below, pulls transport wheel 104 to the wheel's elevated position or allows it to move to bottom most stopped position. Alternatively, instead of a two rope configuration, a single rope may be used that has each of its free ends attached to respective axle end 125 between rollers 117, and a middle portion coupled to a stationary support.

The guide elements include pins 162 formed on opposite sides of top 112 above base 134 and supporting one end of a respective rope 158. Additional pins 164 extend from sidewalls 142 of base portion 134 in opposite directions and are located below respective stop 146 of recesses 144. The pins 162 and 164 may be formed at locations different from the disclosed above, but have to be positioned so that each respective rope 158 is at least slightly tensioned to provide the guidance of wheel 104 along the desired, generally vertical path.

The pins 162, 164 may be molded with top 112 of housing 102; however, all pins may be detachably coupled to top 112 by having, for example, threaded ends which engage respective threaded holes which are formed in top 112 (not shown). Alternatively, the guide elements may include hooks or rings (not shown) having curved surfaces made of material, such as plastic or metal, which generates minimal friction with each rope 158.

Preferably, each rope 158 is made of material highly resistant to wear and having a low coefficient of friction. For example, fishing line can be advantageously used in the context of the invention. Alternatively, the take-up mechanism may be configured with a chain and sprocket assembly (not shown).

Unless stopped in stop 146 or located on the end side of the crest of stop 146, transport wheel 104 always lowers to bottom box 108 and assumes its stopped position in stop 122 when empty. The animal enters housing 102 and proceeds to the running surfaces of wheel 104. As the animal starts running, the free ends of each rope 158 gradually wind on respective axle ends 125, for example, in a counterclockwise direction. As a consequence, the overall distance between the free ends of the rope and its middle portion 160 decreases causing wheel 104 to move towards its elevated position. The wheel 104 may be displaced all the way up to the elevated position and come to rest in a stopped position in stop 146.

Having reached the elevated position, the animal can switch a running direction and cause wheel 104 to rotate in a clockwise direction and move downwards to the stopped position.

Typically, rodents are known for their adaptive behavior. A hamster, for example, learns very quickly that to reverse a direction in which transport wheel 104 moves, it has to change a direction in which it has ran. The diameter of wheel 104, axle 124 and guiding pins is so selected that when a hamster stops running midway between the elevated and stopped position of wheel 104, the latter stops. To further displace the wheel, the animal resumes running.

Figure 3:
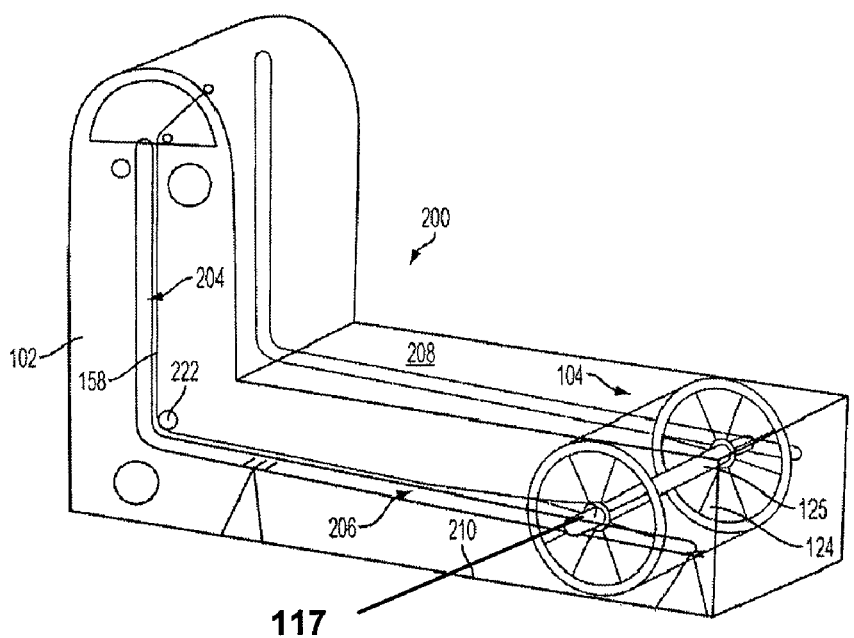
FIG. 3 is a schematic view of another embodiment of an housing and transport wheel assembly according to the present invention.
Figure 84:
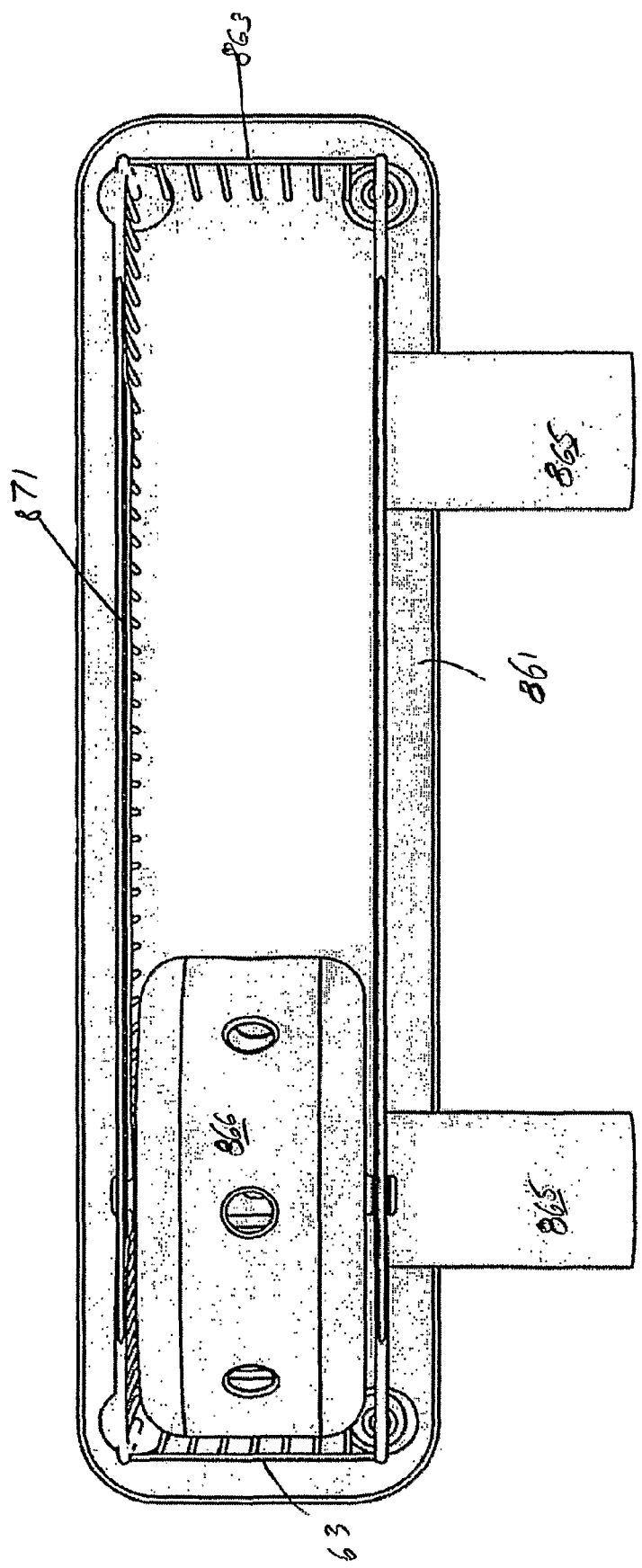

FIG. 3 shows a second embodiment of an housing and wheel assembly 200 constructed in accordance with the present invention. The assembly 200 is configured substantially similar to the housing and wheel assembly 100 of FIGS. 1-2, but in addition, transport wheel 104 is enabled to travel along a travel path having vertical and horizontal stretches 204 and 206, respectively which are defined in the wall of a housing.

Two guide rails 208 are supported above a bottom 210 of housing 102 and have respective ends 214 each positioned to receive axle end 125 of axle 124 as the wheel rolls off vertical stretch 204. Once opposite axle ends 125 land on respective guide rails 208, rope 158 wraps around the lower segments of guide pins 222 as an animal continues to move transport wheel 104 towards the end of horizontal stretch 206. As the animal changes a running direction, wheel 104 will reverse the travel direction and move towards vertical stretch 204 and further up towards the top of housing 102. As illustrated, guide rails 208 are straight. Alternatively, the rails may have a wave-shape providing wheel 202 with an up-and-down movement along a generally horizontal path.

Referring to FIGS. 4A-4B, a track system is added to protect rope 158 from being chewed by an animal. Advantageously, the track may also stabilize wheel 104 as well as conceal the rope. FIG. 4A schematically illustrates a single rope having one of its free ends attached to axle end 125 of transport wheel 104 outside one side of housing 102, as shown in FIGS. 1-2.

A track system 310 is formed on the opposite side of the housing and includes a duct 314 having a narrow passage 312 that leads to the interior of duct 314 enclosing the opposite end of rope 158. The passage 312 is dimensioned to prevent an animal from reaching rope 158 and to allow the opposite axle end to extend through passage 312 into the interior of duct 314 where it is attached to the rope. One of several possible modifications of track system 310 includes the use of two separate ropes. Alternatively, toothed track 330 can be an uncovered strip of metal coupled to the housing.

FIG. 4B illustrates a double-track system 310 having two ducts 314 provided in housing 102 on opposite sides of wheel 104. The ducts receive and enclose respective free ends of a single rope each of which is attached to an axle end. Similar with the previously disclosed embodiment of the track system, two separate ropes each extending within the duct between an axle end and a stationary support can be used.

A further modification of track system 310 is diagrammatically shown in FIG. 4C and includes a toothed track 330 having an array of teeth 332 mesh with teeth 334 of a sprocket 336 which is mounted to axle end. The toothed track 330 may be provided, for example, on the inner surface of duct 314.

FIGS. 5A-5B illustrate a further modification of track system 310. The transport wheel 104 has a sidewall 301 provided with a narrow groove cut 320. The axle end 125 extends through cut 320 and is connected to the free end of rope 358. The cut is dimensioned to be slightly greater than the diameter of axle end 125, which, thus, does not wobble while transport wheel 104 moves in the housing. The other side of the housing has duct 314 configured in accordance with the embodiments as shown in FIGS. 4A-4B.

FIGS. 6A-6B illustrate a further modification of track system 310. Similarly to the structure shown in FIGS. 5A and 5B, wheel 104 may have wall 301 provided with cut groove 320 guiding one end 125 of axle 124 as wheel 104 moves between the top and bottom of the housing. The opposite end of axle 124 extends through the housing and is attached to the rope 158 in a manner as illustrated in FIG. 5B.

FIGS. 7a-7d illustrate various configurations of inventive animal entertainment device assembly of a transport wheel and housing assembly 10. FIGS. 7a-7b illustrate an assembly 10 having in common a housing, i.e. housing 12, a guide unit 14, and a transport wheel 16 that is actuated by a pet to run along guide unit 14 that is oriented substantially horizontally. Therein, FIGS. 7a-7d, are respectively, left-side perspective view, right-side perspective view, front view, and a top view of an assembly.

Specifically, housing 12 includes a top or upper tray 18, a bottom or lower tray 181, and a peripheral wall 13 extending between the trays. The top tray 18 may be made from plastic and includes a central region 19 made preferably from wire to provide light and an unobtrusive view of transport wheel 16. The peripheral wall 13 may be made from plastic or, preferably, from a plurality spaced wires like central region 19 of top tray 18 or vice versa.

Guide unit 14 is defined by the sidewalls of housing 12 each provided with a recess between bottom 11 and sidewall 13. The opposite top guide surfaces of bottom tray 11 are uniformly shaped to have preferably a wave-shape cross-section receiving the axles of transport wheel 16. The sidewalls 13 of housing 12 are preferably made from wire, while tray 11 is made from plastic, but, as explained below, the sidewalls and trays may be formed from different materials.

The wheel assembly 10 may be configured as a stand-alone unit. In accordance with this configuration, it is possible to place an animal within housing 12 and let it use the wheel to its satisfaction.

In one embodiment, animal entertainment device assembly of a transport wheel and housing assembly 10 is configured as part of a habitat cage (not shown). The habitat cage may be dimensioned to receive animal entertainment device assembly of a transport wheel and housing assembly 10 within the interior of the habitat cage, which preferably has a larger volume. Alternatively, a habitat cage an animal may be placed adjacent wheel assembly 10 as seen in FIGS. 1-2.

Regardless of how the habitat cage is configured, bottom tray 11 of assembly 60 may have one or more ingress/egress points or openings. Each opening is dimensioned to receive a conduit 15, such as the one shown in FIG. 7a. The conduit has one of its opposite ends extending into the habitat cage and the other end terminating in the plane of bottom tray 11 or extending further inwards into housing 12.

The conduit 15 is configured to provide an animal with an easy ingress/egress into and out of transport wheel 16. Once inside transport wheel 16, an animal may ingress/egress only through a conduit 15. The ingress/egress points provided with conduit 15 lead from housing 12 to a habitat cage, as explained above.

The egress/ingress port may be shaped and dimensioned to allow an animal, such as a mouse, hamster, rat, squirrel, rat and similar animals, to unobtrusively enter and exit transport wheel 16. The egress/ingress port, thus, may have various shapes including, for example, a circularly shaped opening as shown.

The bottom tray 11 is a longitudinal structure having, as shown, a generally rectangularly shaped cross-section defined by a bottom and a peripheral wall erected upon the bottom. The peripheral wall, thus, has a pair of longitudinal sidewalls, the opposite end regions of which are bridged by respective endwalls 22.

Made preferably from plastic, top tray 18 includes a viewing portion, such as central region 19, to provide viewers of the pet's activity. It may be made of wire or plastic that may be colored or covered with a layer capable of glowing in the dark to provide unit 10 with a strong aesthetic appeal.

Alternatively, the components of trays 11 and/or 18 may be made from glass or any other material. If tray 11 or 18 is made from plastic, manufacturing of tray may include, without any limitation, molding techniques known by one of ordinary skill in the art.

The peripheral walls 13 may also be designated sidewalls and endwalls 20 and 22, respectively, may be manufactured as a single unit or as separate components assembled together by any known assembling methods including, without any limitation, removably fastening or gluing the components together.

The shape and dimensions of tray 1 of unit 10 may vary. However, regardless of the tray's shape, it is configured to include a guide structure 14 guiding transport wheel 16 along a longitudinal travel path.

In accordance with one modification, guide assembly, having two opposite and spaced apart sidewalls, is integrally formed with a bottom tray. The assembly is mounted on the bottom of the bottom tray so that the sidewalls are spaced inwards from and extend above the sidewalls of the bottom tray to define respective passageways each formed between opposing guide assembly sidewalls and housing sidewalls. The passageways allow a pet to run therealong without entering the interior of the transport wheel. The bottom tray and guide assembly may be molded as a unit or manufactured separately to be removably attached or fixed to one another.

Alternatively, a guide unit may be formed without passageways by having sidewalls the tray function as a support for the wheel, as disclosed with respect to FIGS. 7a-7d. In this case, at least one of sidewalls 20 of tray 11 is formed with ingress/egress port.

Returning to FIGS. 7a-7d, the elongated sidewalls 20 of unit 10 have respective upper surfaces 24 configured as a guide track for transport wheel 16, which, for example, may be a hamster wheel with axles or shafts 26 extending laterally outwards from respective opposite sides of wheel 16. As shown in the drawings, wheel 16 has two separate shafts or axles 26, but, as one of ordinary skills in the art can conceive, a single axle extending along the axis of symmetry of transport wheel 16 can be used to mount transport wheel 16 to housing 12.

The end 28 of each shaft or axle 26 is grooved to have a generally U-shaped cross-section allowing the bottom of the groove to abut guide surfaces 24 of sidewall 20 while the flanks of the groove overlap the upper regions of respective inner and outer faces of sidewall 20. Consequently, transport wheel 16 mounted on guide surfaces 14 of sidewalls 20 of guide unit 10 is stabilized and prevented from being "derailed" even if transport wheel 16 experiences substantial lateral (with respect to the longitudinal axis) external forces. Alternatively, guide surfaces 24 each can be structured with a longitudinal U-shaped formation configured to receive the periphery of shaft end 28.

The axle or axles 26 are rotatably fixed to transport wheel 16 so that when a torque is applied to transport wheel 16, the latter is capable of transmitting the torque to axles 26, which are, thus, actuated to roll along guide surfaces 24 of respective sidewalls 20 of guide unit 10. A pet entering the interior of transport wheel 16 and running along the inner race thereof in the known manner applies the external torque.

Preferably, guide surfaces 24 each are structured to have a contour differing from a straight line. As shown in FIGS. 7a-7d and 8a-8d each guide surface 24 has a generally wave-shaped cross-section characterized by alternating crests 30 and valleys 32. The configuration of guide surfaces 24 of respective tray's sidewalls 20 is uniform; however, the number of crests and valleys 30 and 32, respectively, may vary along the longitudinal path of transport wheel 14.

The configuration of valleys 32 along the same guide surface 24 may be not uniform; for example, some of valleys 32 may extend at a greater distance towards the bottom of tray 11 or/and have steeper slopes than others valleys. Similarly, crests 30 formed along same guide surface 24 may not be uniformed.

However, aligned valleys 32 and crests 30 of respective guide surfaces 24 are uniform to prevent transport wheel 14 from tilting relative to the longitudinal axis of housing 12. Consequently, axles 26 of transport wheel 16 lie in a plane extending perpendicular to the plane of the longitudinal axis of tray 11 along the entire travel path of transport wheel 16.

The opposite end regions of each guide surface 24 are configured as respective stops to prevent transport wheel 16 to run beyond the guide track. As shown in FIGS. 7a-7d, each end region has a relatively deep valley 34 with a steep slope 36 configured to prevent axles 26 to climb up slopes 36 once transport wheel has reached the latter.

Alternatively or in addition to the stop disclosed above, the end regions of respective surfaces 24 each may be provided an additional stop (not shown) that ensures the position of axle ends 28 within valleys 34. While the configuration of guide surfaces 24 have been disclosed in reference to sidewalls 20 of guide unit 10, one skilled in the art readily understands that the embodiment of FIGS. 8a-8d, if configured to guide transport wheel 16, each sidewall can be configured to have a wave-shaped cross-section similar to the one disclosed above.

The transport wheel 16 is configured with a plurality of spokes 38 extending from axle 26 to have a space 40 between each pair of adjacent spokes 38 sufficient for the entry and/or exit of a pet into/from the interior of transport wheel 16. When the pet, for example, enters ingress/egress port 11a, it necessarily ends up in the interior of transport wheel 16 through one of spaces 40 and firmly positions itself on the race of transport wheel 16 defined between the transport wheel's opposite walls.

The round shape of transport wheel 16 may be modified so that the transport wheel would assume any shape differing from the round one. The spokes 38 of transport wheel 16 may be replaced by solid walls each of which has a plurality of respective formations configured to allow the pet in and out from the interior of transport wheel 16. Various materials may be used for manufacturing transport wheel 16 including, for example, plastic. To enhance the appearance of transport wheel 16, its body may be painted in different colors or covered by a glowing layer.

In use, the pet enters the interior of transport wheel 16 and runs on the lower segment of the transport wheel's race in one direction to cause transport wheel 16 to spin and travel along guide surfaces 24. Having reached stop valley 34, transport wheel 14 continues to freely spin without further advancement, as shown by arrows 42, unless and until the pet changes its running direction.

In another embodiment of an animal entertainment device assembly of a transport wheel and housing assembly does not include the side and top walls of a housing. The wheel assembly includes a guide unit and a transport wheel which is guidably driven along the guide track of guide unit in response to a torque generated by a pet running on a race of transport wheel. The wheel assembly is distinguished from other wheel assemblies by the configuration of guide unit, which has two spaced apart and uniformly configured wire guides. Each of the wire guides has a wave-shaped cross-section provided with a plurality of alternating rests and valley.

The wire guides each are dimensioned to support the bottom of a grooved shaft or axle end. The opposite end regions of the respective wire guides each have a stop unit and a substantially vertical leg embedded in or removably coupled to the bottom of housing.

The peripheral wall of the housing may be configured with an ingress/egress point (not shown) to allow a pet to enter into and out of the housing and freely enter into the interior of transport wheel. In response to a torque applied by the pet, the transport wheel travels along a longitudinal path defined by the guide unit. The direction of the torque defines the travel direction of the transport wheel. Once the transport wheel reaches either of the opposite ends of the track, it further freely rotates until the torque is ceased or the torque's direction is reversed. The guide unit may be made from any suitable metal.

In a further embodiment, an animal entertainment device assembly includes two wire tracks and a transport wheel. Structurally, the housing has a top tray. The top tray may be removably placed on top of housing, or fixed thereto. If the top tray is integrally formed with the housing, a door may be hingedly mounted to the top tray, as well understood by one of ordinary skills in the art.

In a further embodiment, an animal entertainment device assembly incorporates selected features of the previously disclosed embodiments. Provided with a housing and a transport wheel, the assembly has a guide unit that includes a first guide surface made from wire and a second guide surface recessed in one of the sidewalls the housing.

The guide surfaces are uniformly configured to have a wave-shaped cross-section and dimensioned to receive respective opposite ends of the transport wheel's axle. The support structure is not centered along the axis of symmetry of housing, but laterally offset relative to the axis to allow the animal to run in space. The assembly has a peripheral wall made from wire, whereas the peripheral of another housing may be made from plastic and formed with a conduit which provides an animal with a an opportunity to enter or exit the housing.

The principle of operation of a further embodiment of the assembly remains the same as the one disclosed immediately above and includes placing transport wheel—a hamster transport wheel—inside a housing and allowing a pet to run within the wheel to advance it along the guide surfaces. In addition, as disclosed above, the assembly may be used as a stand alone unit or placed in a larger cage communication with a housing via a conduit.

Referring to FIGS. 7a-7d, one or more conduits 15 are configured to provide an animal with an entrance and exit into and from, respectively, transport wheel. The conduit is not shape-dependent and thus is not limited to a cylindrical cross-section.

In use, the assembly may be placed inside a larger cage or next to another cage so that, for example, the animal can run along a conduit extending between the entrance of the cage and the opening to transport wheel housing. The sidewall of the housing may or may not have a recessed region aligned with opening. Since the tray-shaped bottom of some housings is relatively low, the animal may simply jump over the sidewall of such housing and enter the interior of the transport wheel.

While conduits may be placed toward the ends of the housing, they may also be provided substantially midway between the opposite end regions of guide unit directly or at the housing In a further embodiment, the contrast to the previously disclosed embodiments, includes a support structure that has two ingress/egress ports each provided in the sidewall of support structure with a respective conduit in each. The conduits are each configured as a conduit coupling the interior of a housing and the interior of transport wheel.

The animal may enter through either of these conduits and further find its way into the interior of transport wheel. Although two ports are shown to be formed on the same sidewall, it is conceived that opposite sidewalls of a support unit may have respective entry ports. In use, the assembly is mounted to a cage or placed adjacent thereto so that conduits provide the animal with a conduit connecting the interiors of the cage and support structure.

Further embodiments of assembly 10 are possible. For example in a further embodiment, the sidewalls of guide unit are spaced inwards from the respective sidewalls of the housing and, yet, are configured to guide the transport wheel along a longitudinal path.

In the further embodiment, if the wheel assembly is configured as a stand-alone unit, it is possible to place an animal within the housing and let it run along a conduit formed between the sidewalls of guide unit and the respective sidewalls of the housing.

In contrast to the embodiment of FIGS. 7a-7d, the assembly of the further embodiments has a single conduit, which has one end terminating in the plane of a bottom tray or extending further inwards into the housing. The conduit is configured to provide an animal with an easy ingress/egress into and out of the transport wheel. The sidewalls of the guide unit are spaced from the sidewalls of the housing so that an animal does not have to apply extra efforts to enter the interior of the transport wheel from the conduit. Once inside the transport wheel, an animal may ingress/egress only through the conduit.

The animal entertainment device assembly of a transport wheel and housing assembly shown in the embodiment of FIGS. 7A-7D or in a related embodiment wherein the guide units are positioned inward in the housing, animal entertainment device assembly of a transport wheel and housing assembly 10 is configured with guide unit 14 positioned inward of the sidewall 13 of the housing. One of the sidewalls of guide unit 64 is provided with two ingress/egress points allowing an animal to enter into the interior of transport wheel 16 from a passageway formed between the opposing sidewalls of guide unit 14 and housing 12. Preferably, the ingress/egress points are located at opposite ends of the longitudinal path of transport wheel 16.

The ingress/egress point of housing 12 and conduit 15 allowing the animal to shuttle between housing 12 and an external habitat cage (such as the one in FIGS. 1 and 2) are provided in the central region of sidewall 13 of housing 12 between ingress/egress points 11a and 11b of guide unit 14. The sidewall of housing 12 may be defined by a plurality of spaced wires; however, plastic materials may also be used for manufacturing sidewall 63.

In still another embodiment of animal entertainment device assembly of a transport wheel and housing assembly 10, guide units 14 includes two wire tracks mounted inside housing 12. The ingress/egress point of housing 12, configured to receive conduit 15, can be formed at any location of bottom trays 11, since an animal can enter the interior of travel wheel 16 at any location along the longitudinal travel path of wheel 16 as opposed to guide units 14 made of a solid wall such as the one shown in FIGS. 7a-7d.

FIGS. 8a-8d illustrate topless animal entertainment device assembly of a transport wheel and housing assembly 60 configured in accordance with a further embodiment and including sidewalls 63 that are made from a plurality of spaced wires and have respective recesses 73 above tray 61, respectively. Thus, recesses 73 divide sidewalls 63 of housing 62 into upper and lower portions 71 and 75, respectively. A plurality of conduits 65 similar or identical to conduit 15 are disposed at one or more points, preferably at a beginning and an end point of the transport wheel.

Therein, FIGS. 8a-8d, are respectively, left-side perspective view, right-side perspective view, front view, and a top view of an assembly.

The lower portion 875 has a guide surface preferably, but not necessarily, having a wave-shaped cross-section and functioning as a guide surface of transport wheel 866. The opposite end regions 881 of upper portions ensure that transport wheel 66 is not derailed by arresting upward motion of transport wheel along the tracks. In the embodiment with guide unit 864 and housing 862 formed from plastic, inventive assembly 860 is preferably molded in one piece. The guide unit 64 made from wire may be detachably mounted to bottom tray 861. The above and other embodiments will be disclosed in somewhat greater detail below.

In a further embodiment suitable in combination, but especially suited to that of FIGS. 8a-8d, a animal entertainment device assembly of a transport wheel and housing assembly 860 comprising a top made of wire. While the guide unit may be made of plastic or wire and the location of the conduit may differ, the top is made entirely of wire. A continuous curtain of spaced apart wires is connect to a bottom at one end or an end region, such as region 881, and the wire formed top, which is preferably planar wire surface. Therein, maximum light and air enter the assembly. Further, the particular look may more easily match that of habitat cages.

In a further embodiment, instead of one or two conduits, an assembly 10 may have three ports. Such an arrangement, preferably includes a guide unit 14 configured to have a wall and that is spaced inward from a sidewall. Therein, two ports are provided, preferably at each end of the guide unit wall, while one port is provided in the sidewall in a central location. Each of exterior port is connected to a conduit. The animal can then move advantageously in the space provided between the sidewall and a guide unit wall.

FIGS. 9a-9e illustrate a further embodiment of inventive assembly 50 configured with an annular housing 52 which has spaced top and bottom 54, 55, respectively, coupled together during a manufacturing stage, such as a molding process. Peripheral walls 53a and top wall 53b are provided to retain the animal in the unit.

In FIGS. 9b-9e, the peripheral walls and top wall have been removed for clarity. Alternatively, the components of housing 52 may be manufactured separately and detachably coupled together by means of a bolt and nut assembly or fastening. Mounted on bottom 54 is a support structure configured with two spaced apart and elevated annular tracks 56 each supported by a plurality of angularly spaced apart pins 64.

The annular tracks 56 are configured to provide a support and guide for a transport wheel 60 which is mounted on the tracks by respective axles 60 extending in opposite directions from transport wheel 60. Since outer track 56 is spaced a greater radial distance from the center of housing 52, outer axle 60 running along the outer track is longer than inner axle 60. Therein, the tracks may comprise a shape such as the wave shape and comprise crests and troughs.

The top 55 and bottom 54 of housing 52 have respective aligned central openings 72 dimensioned so that a cage (not shown) can be within the openings. In other words, housing 52 can surround the cage. A conduit 62 configured, for example, with a cylindrically shaped cross-section, provides a conduit for the caged pet between the interior of the housing and a space 86 (FIG. 9c) immediately adjacent to the side of transport wheel 60. The conduit 62 may have a variety of configurations and, thus, is not limited to the cylindrical shape as shown in the drawings.

Alternatively, conduit 62 may extend so that it opens into the interior of transport wheel 60. Preferably, transport wheel 60 is centered along annular bottom 54 of housing 52. However, the configuration of assembly 50 with transport wheel 60 mounted offset relative the axis of symmetry of bottom 54 is also conceived.

Figure 9A:
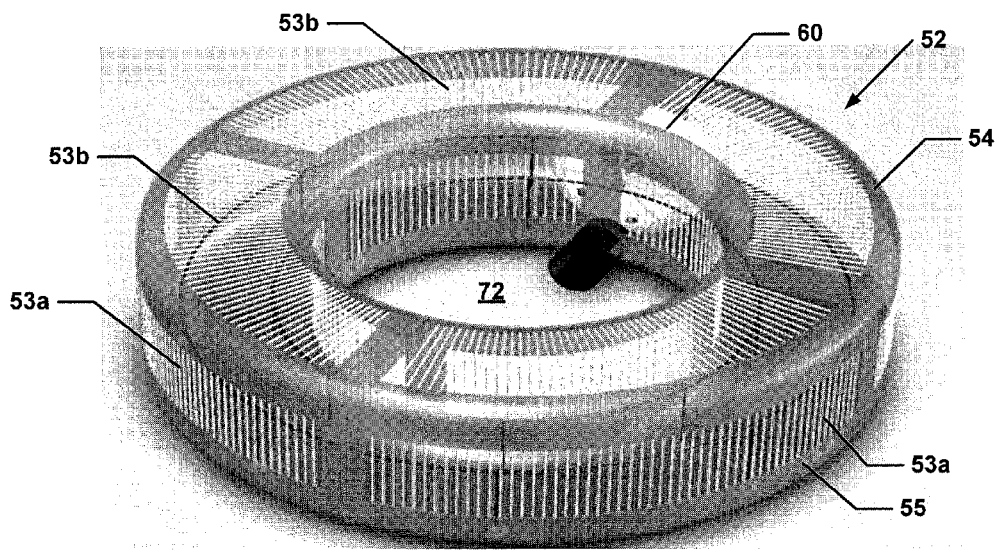
FIGS. 9a-9e are respective orthogonal, side, orthogonal and bottom views of the inventive animal entertainment device assembly of a transport wheel and housing assembly configured in accordance with still another embodiment of the invention.
Figure 9B:
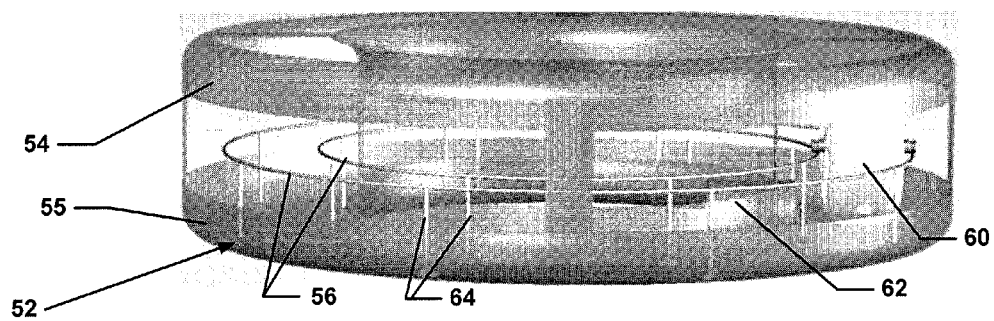
Figure 9C:
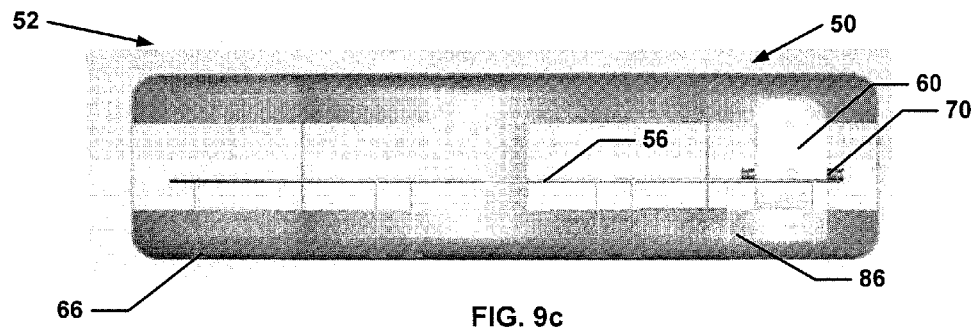
Figure 9D:
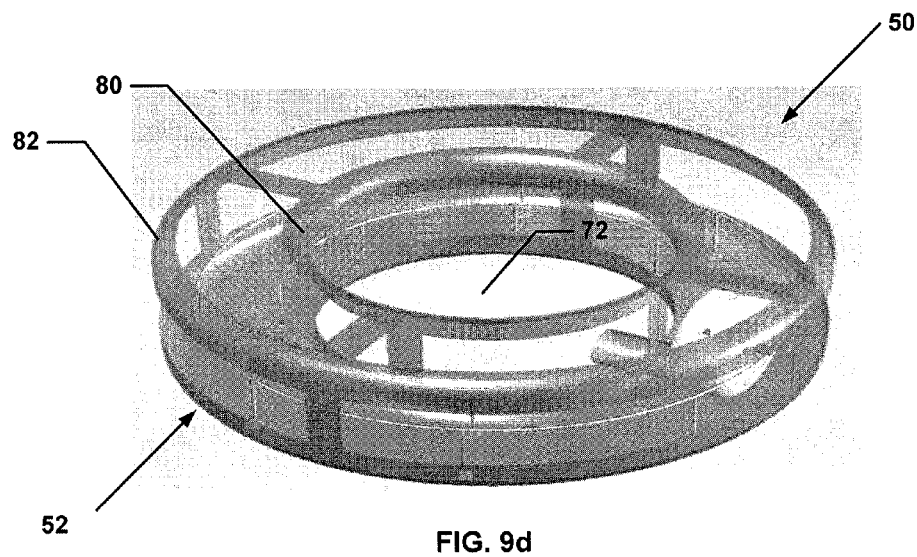
Figure 9E:
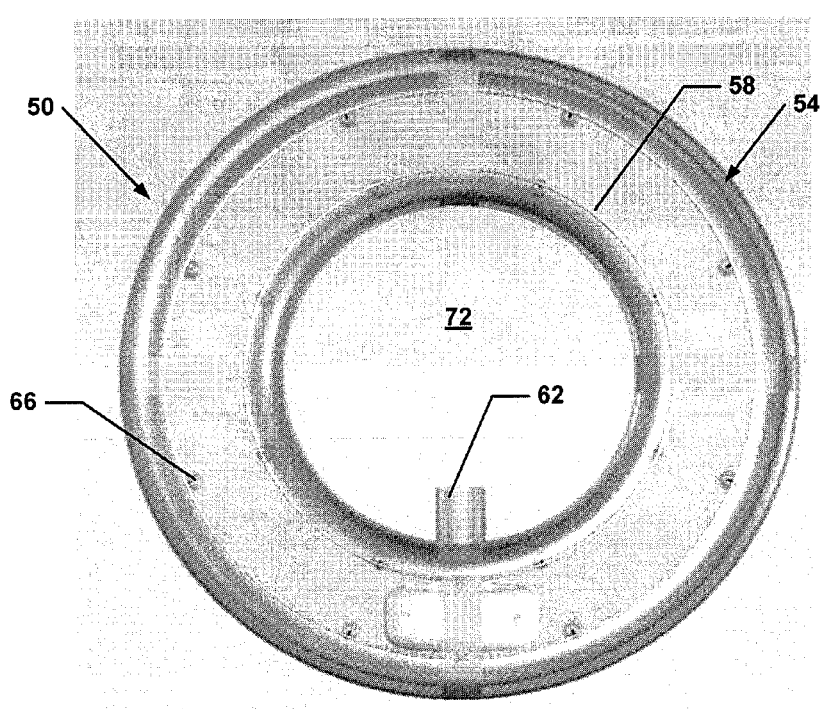

While bottom 54 of housing 52 has a continuous web 58 (FIG. 9d) configured to provide a support for the periphery of transport wheel 60, top 55 of housing 52 has two spaced apart annular segments 80 and 82 (FIG. 9c). However, segments 80 and 82 may be bridged by a roof. The pins 64 elevating tracks 56 above bottom 54 of housing 52 may be coupled to the latter by various methods including, for example, screws each of which is received in a socket 66 (FIGS. 9c and 9e) formed on bottom 54.

The configuration of assembly 50 may be slightly modified by providing conduit 62 so that it extends outwards (not shown). In accordance with such a modification, assembly 50 may be used as a stand-alone structure positioned adjacent to a cage, which thus does not have to be located inside housing 52 as disclosed above. The functionality of assembly 50, like the rest of the previously disclosed embodiments, is not shape-dependent. For example, housing 52 may have a substantially 8-shaped cross-section provided with a similarly shaped guide structure for transport wheel 60.

FIGS. 10a-10g illustrate a further modification of inventive assembly 90 differing from the assembly of FIGS. 9a-9e by the structure of a bottom side 91 of the assembly's housing. In contrast to the previously disclosed embodiment, bottom side 91 is continuous and, thus, does not have a central opening.

Figure 10A:
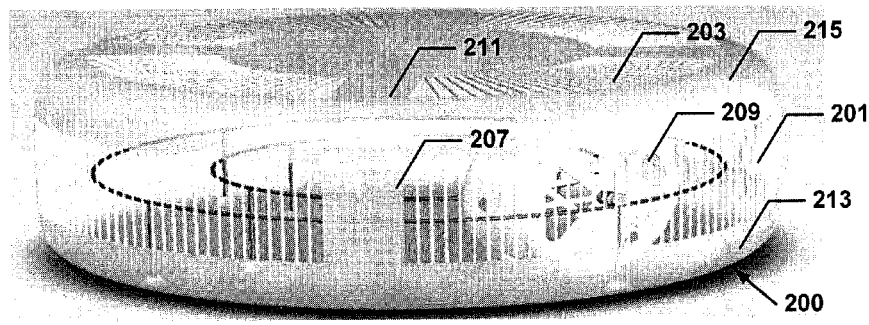
FIGS. 10a-10g are respective orthogonal, side, front views of the inventive animal entertainment device assembly of a transport wheel and housing assembly configured in accordance with another embodiment of the invention.
Figures 10B, 10C:
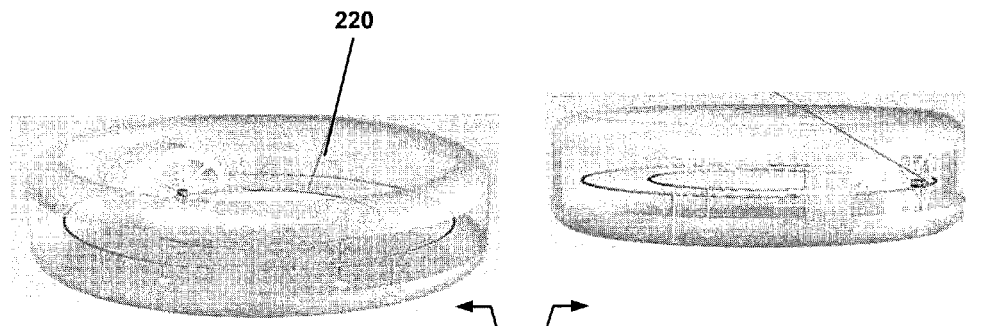
Figures 10D, 10E:
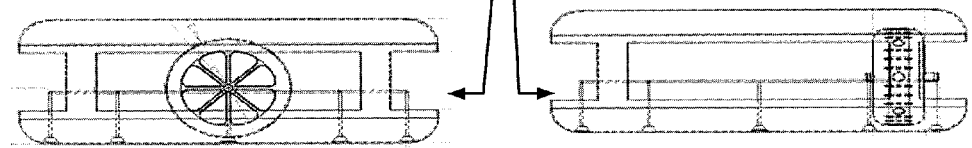
Figures 10F, 10G:
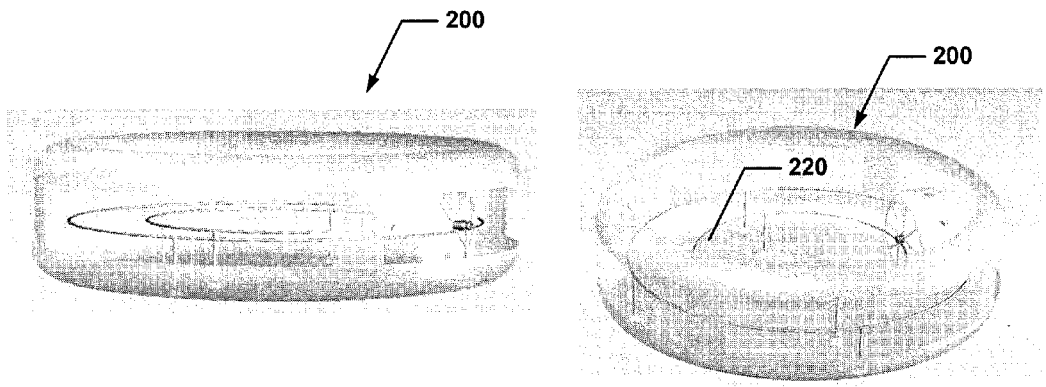

FIG. 10a shows a housing having a round shape and including upper and lower trays 92 and 93, respectively, and a peripheral wall bridging the trays. The lower tray 93 is provided with a continuous bottom made from plastic; upper tray 92 is configured with alternating relatively large segments 94 and relatively small segments 95. The relatively large segments 94 each are made from wire to allow an observer a clear view of a pet-actuated transport wheel. The relatively small continuous segments 95 are made from plastic. The number, shape and dimensions of segments 95 and 94 may vary. The interior of the transport wheel is provided with a plurality of spaced ribs 96 extending between the opposite sides of the transport wheel and providing a support for a running pet.

The peripheral wall of assembly 90 is configured with alternating continuous regions 207 made from plastic and regions 96 defined by a plurality of wires which are spaced apart to enhance a view of the displaceable transport wheel from outside. Similarly to upper tray 92, segments 97 and 98 of the peripheral wall may have various dimensions.

Figure 11:
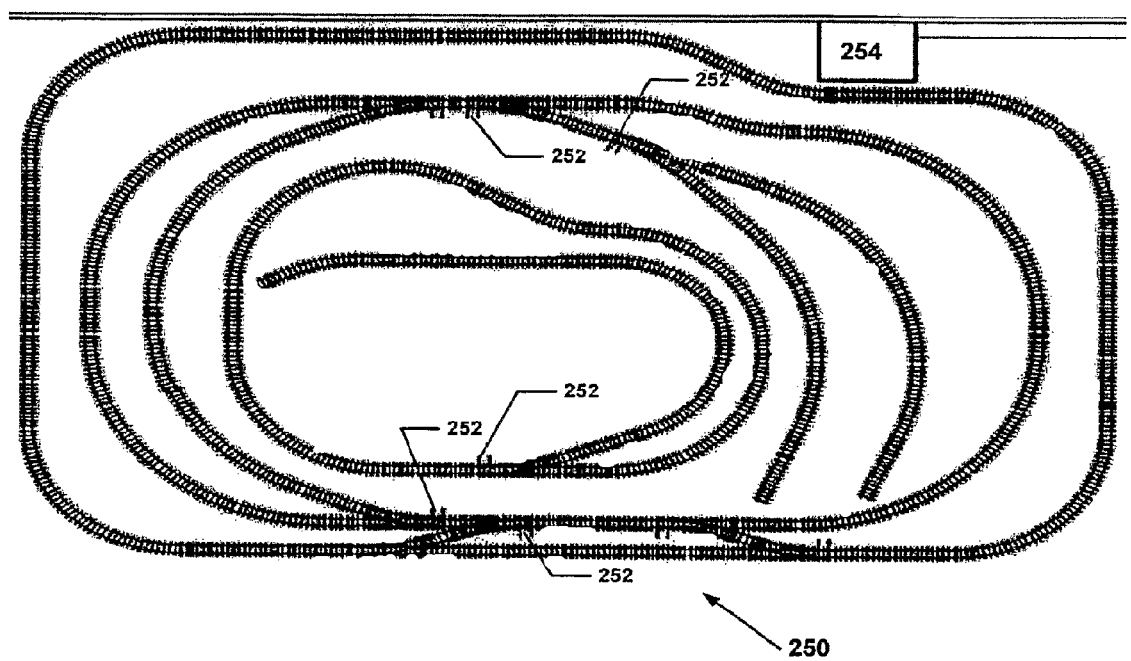
FIG. 11 is a plain view of a track unit of the inventive animal entertainment device assembly of a transport wheel and housing assembly configured in accordance with an eighth embodiment of the invention.

FIG. 11 illustrates a simplified configuration of a track guide system 99 that much like a model railroad track. The track guide system 99 may be provided with a plurality of Y-switches 99a that may be automatically controlled by a program executed by a CPU 99b or manually by the assembly operator via CPU 99b. This embodiment allows a transport wheel guided by track system 99 the assembly operator to change its route depending on the actuation of switches 99a.

Returning to FIGS. 1 and 2 to illustrate a further embodiment of the invention configured in the form of a housing assembly, a housing assembly 600 includes a transport wheel and a housing assembly (referred to as a transport wheel assembly), a cage 610, and conduits 700. The transport wheel assembly may be configured as any animal entertainment device assembly of a transport wheel and housing assembly taught above. For example, it may be oriented vertically or horizontally, or switchable between these positions, or one that is round.

Cage 610 is suitable as a habitat cage for a pet, such as a mouse, rate, gerbil, or the like. If suitably scaled, it may be used for other animals. Cage 610 includes a main cage base 612 suitable for sitting on a support surface such as a floor. Cage base 612 is preferably configured to have a depth suitable for the resident pet and a ground cover surface. Cage base 612, like other wall components of cage 610, is made of solid plastic or like material, for durability and easy of cleaning.

Although cage 610 is illustrated to have a substantially rectangle in plan having two end walls and two longitudinal walls and spatially is substantially box shaped, any shape that is suitable may be used. Consistent through the design of cage 610, all sharp edges and angles have been softened to provide a safer, more natural experience to the pet and pet owner.

Cage 610 includes a lower peripheral wall 614 that provides an initial wall extension on top of cage base 612. Wall 614, in turn, supports wall components 616-622. An interior cage space is defined by the main cage base 612, peripheral wall 614, and wall components 616-622.

Wall 614 supports a left end portion 616 and a right end portion 618 each comprising a respective end wall section 616a, 618a, a first and second adjacent longitudinal wall sections 616b, 618b, and a roof section 616c, 618c.

End portions 616, 618 illustrate the versatility of cage 610 and the different design components. For example, end portion 616 comprises spaced-apart cage wire in the end wall section 616a and longitudinal wall sections 616b but a roof section 616c that is solid plastic. In contrast, end portion 618 is made entirely of solid plastic such that sections 618a, 618b, and 618c form a unitary cage roof section. Of course, the variation of spaced apart wire and solid plastic walls may be suitable changed.

Further, end portion 618 includes an opening for providing a conduit that leads to a loft, to be described.

Cage 610 includes a longitudinal section 620 comprising spaced apart cage wire bent to have a substantially L-shaped form. It should be appreciate that end portions 616, 618 may be formed similarly and that solid plastic walls as taught with respect to end portion 618 may also be used instead of spaced-apart cage wire.

Opposite longitudinal section 620 is a door 622 that provides access to the interior cage space. Door 622 comprises an exterior frame 622a having a substantially L-shaped frame into which an interior frame 622b that substantially matches frame 622a is provided. Frame 622b may have insert 622c that is made of spaced-apart cage wire as shown or solid plastic walls may be used. Frame 622b is pivotally hinged to frame 622a at a distal location, preferably the longitudinal centerline of cage 610.

A door latch and catch 622d may be provided on door 622 that locks interior frame 622b to frame 622a. Therein, preferably the latch is pivotally hinged and functions as a striker and keeper. Of course, other types of latches including a clip and catch, living hinge latch, twist knobs, button locks may be used. Door latch and catch 622d may also be disposed on peripheral wall 614 and interior frame 622b.

The aforementioned wall components 616-622 may be formed integrally with peripheral wall 614 such that cage 610 comprises of lower cage base 612 and an upper portion provided with an interesting and varied array of different walls and styles. Therein, peripheral wall 614 may include a ledge wherein lower peripheral edges onto which other wall components are molded.

However, components 616-622 may also be interchangeable. Therein, peripheral wall 614 may include a ledge wherein a lower peripheral edge rests and side and top peripheral edges may meet like edges from other wall components. Such edges are preferably formed using tongue and groove combinations that enhance the junction between wall components. Methods of snap-fitting wall components together may also be used.

Cage 610 includes one or more indented spaces 624 that vertically encompasses the entire cage height and/or one or more indented spaces 626 that is disposed in only a portion of the cage height, such as the cage base 612, the peripheral wall 614, and a portion of a wall component. In any event, the space is preferably provided with a latch and catch 628 that locks main cage base 612 to at least the peripheral wall 614 so that a user can separate these parts for easy access to the interior space of the cage for cleaning or the like.

One or more access ports 630 may be provided wherein a conduit 700 may permit controlled movement of the pet to another portion of the housing assembly, such as the transport wheel. Therein, to control movement, the conduit or access port or both may be provided with a one-way door that permits the animal to substantially move in only one direction through the port.

An access port 630 may also be provided for the pet to access a loft 632 situated strategically on top of cage 610. Loft 632 configured as a base 632a and a top 632b pivotally hinged at a distal end or any convenient location that permits easy access to the pet. The hinged top may have a hemispherical shape in a side view and comprise solid plastic surface that include cut-out portions 632c that have spaced-apart cage wire.

Loft 632 may include a platform suitable for the pet to orient itself after crossing in a conduit from the transport wheel to the loft. The pet may then enter cage 610 through an access port, explore his habitat cage further and then via ramp 634 traverse toward a lower port.

The pet may enter the conduit and, in turn traverse it. When the transport wheel is stored in an upward position, the pet may simply explore the empty space of the transport wheel housing. Of course, the end of the conduit at the housing may be provided with a door that remains closed when the transport wheel is not in a lower position.

However, pets learn quickly and when the empty space of the transport wheel is found the pet may return the lower conduit to the habitat cage and advance through another conduit to the transport wheel and ride it for pleasure.

In a particular embodiment shown in FIGS. 1 and 2, the transport wheel is configured to have the axle connection of the rope, i.e. 124 when stored to be above the position of the end portion 160. Thus, once the pet has exited the transport wheel, the transport wheel moves to the bottom of the housing, i.e. to portion 108.

Further, once the pet has left the loft it is preferred that reentry via the access port is prevented to the loft so that the pet does not proceed errantly into the now empty top most position of the transport wheel housing. Consequently, in the embodiment of FIGS. 1 and 2, the he access port from the loft to cage 610 is vertical and is sufficiently spaced from a support surface such as ramp 634 that the animal can comfortably climb down, but not up.

While the invention has been described in conjunction with specific embodiments, it is to be understood that many alternatives, modifications and variations will be apparent to those skilled in the art in light of the foregoing description.

What is claimed is:

1. An animal entertainment device assembly comprising:
a rotatable wheel powered by an animal;
an housing defining an inner space and preventing escape of the animal;
a guide system associated with the housing, the guide system comprising a guide surface, the guide surface defining a path comprising a first position and a second position distal from the first position, the wheel being received in the inner space and traversing the path from the first position to the second position; the guide system maintaining the wheel on the path;
wherein the wheel comprises an axle directly engaging the guide surface.

2. The animal entertainment device assembly of claim 1, wherein the wheel comprises a first lateral side that is closed and a second lateral side that is open for access by an animal.

3. The animal entertainment device assembly of claim 1, wherein the wheel comprises a first lateral side that is delimited by spokes and a second lateral side that is open for access by an animal.

4. The animal entertainment device assembly of claim 1, wherein the guide system comprises a guide surface that includes a crest and a valley.

5. The animal entertainment device assembly of claim 1, wherein the housing comprises a plurality of portions, one of the plurality of portions being movable relative to the other portions to remove the wheel for cleaning.

6. The animal entertainment device assembly of claim 1, wherein the housing is associated with a floor, the guide system maintaining a lowermost portion of the wheel distal from the floor.

7. The animal entertainment device assembly of claim 1, wherein the wheel is supported only by the guide system.

8. The animal entertainment device assembly of claim 1, wherein the wheel comprises an inner circumferential surface, the wheel being rotatable when an animal runs on the inner circumferential surface.

9. The animal entertainment device assembly of claim 1, wherein the guide surface is integral with the housing.

10. The animal entertainment device of claim 1, wherein the housing comprises a wirewall.

11. An entertainment device assembly for an animal, the assembly comprising:
- a guide unit mounted on with a housing, the housing having an inner space, the guide unit comprising a plurality of guide surfaces, each guide surface comprising a start point and an end point that are distal from each other, the start and end points of each guide surface being arranged to define a common travel path in the inner space;
- a wheel comprising an inner circumferential surface and an axle, the wheel comprising a lateral side restricting access to the inner space, the wheel being rotatable when an animal runs on the inner circumferential surface; wherein the axle directly engages the guide surfaces when traversing the path.

12. The entertainment device assembly of claim 11, wherein the wheel is removable from the guide unit and housing for cleaning.

13. The entertainment device assembly of claim 11, wherein the start points and the end points are disposed in a substantially horizontal plane.

14. The entertainment device assembly of claim 11, wherein the guide unit comprises a metal guide surface.

15. The entertainment device assembly of claim 11, wherein the guide surface comprises one of a crest and a valley.

16. The entertainment device assembly of claim 11, wherein the housing comprises a wirewall.

17. An entertainment device assembly for an animal, the assembly comprising:
- an housing, a guide system, and a wheel comprising an axle and being powered by an animal;
- an inner space within the housing, the inner space traversed by the wheel on the guide system; the axle positioned through the center of the wheel and the axle directly engaged with a guide surface of the guide system; wherein the axle moves laterally along the guide surface; wherein the wheel is supported only by the guide system.

18. The entertainment device assembly of claim 17, wherein the wheel comprises an inner space that is accessible by the animal on only one lateral side.

19. The entertainment device assembly of claim 17, wherein the wheel is spaced from a sidewall of the housing to prevent injury to the animal.

20. The entertainment device assembly of claim 17, further comprising a ramp leading to the wheel.

21. The entertainment device assembly of claim 17, wherein the housing further comprises an upper portion for retaining the wheel on the guide system.

22. The entertainment device assembly of claim 17, wherein the housing further comprises a wirewall.

23. The entertainment device assembly of claim 17, wherein the guide system comprises a wave-like shape.

24. The entertainment device assembly of claim 17, wherein the housing comprises one of an annular shape or a box shape.

* * * * *